(12) United States Patent
Chu

(10) Patent No.: US 9,216,414 B2
(45) Date of Patent: Dec. 22, 2015

(54) MICROFLUIDIC DEVICES AND METHODS FOR GENE SYNTHESIS

(75) Inventor: Larry Li-Yang Chu, Brighton, MA (US)

(73) Assignee: Gen9, Inc., Cambridge, MA (US)

( * ) Notice: Subject to any disclaimer, the term of this patent is extended or adjusted under 35 U.S.C. 154(b) by 0 days.

(21) Appl. No.: 13/511,850

(22) PCT Filed: Nov. 19, 2010

(86) PCT No.: PCT/US2010/057392
§ 371 (c)(1),
(2), (4) Date: May 24, 2012

(87) PCT Pub. No.: WO2011/066185
PCT Pub. Date: Jun. 3, 2011

(65) Prior Publication Data
US 2012/0283140 A1    Nov. 8, 2012

Related U.S. Application Data

(60) Provisional application No. 61/264,632, filed on Nov. 25, 2009.

(51) Int. Cl.
| | |
|---|---|
| C12M 1/34 | (2006.01) |
| C12Q 1/68 | (2006.01) |
| C12P 19/34 | (2006.01) |
| C12M 1/00 | (2006.01) |
| G01N 15/06 | (2006.01) |
| C07H 21/02 | (2006.01) |
| C40B 40/06 | (2006.01) |
| B01L 3/00 | (2006.01) |
| B01J 19/00 | (2006.01) |
| B01L 7/00 | (2006.01) |

(52) U.S. Cl.
CPC ....... *B01L 3/502784* (2013.01); *B01J 19/0046* (2013.01); *B01J 2219/0052* (2013.01); *B01J 2219/00286* (2013.01); *B01J 2219/00511* (2013.01); *B01J 2219/00596* (2013.01); *B01J 2219/00619* (2013.01); *B01J 2219/00653* (2013.01); *B01J 2219/00655* (2013.01); *B01J 2219/00722* (2013.01); *B01L 7/52* (2013.01); *B01L 2300/161* (2013.01); *B01L 2300/1861* (2013.01); *B01L 2400/0478* (2013.01); *B01L 2400/0487* (2013.01)

(58) Field of Classification Search
USPC ................ 435/6.1, 91.2, 283.1, 287.2, 288.5; 422/68.1; 536/23.1; 506/16
See application file for complete search history.

(56) References Cited

U.S. PATENT DOCUMENTS

| | | |
|---|---|---|
| 4,500,707 A | 2/1985 | Caruthers et al. |
| 4,683,195 A | 7/1987 | Mullis |
| 4,683,202 A | 7/1987 | Mullis |
| 4,689,405 A | 8/1987 | Frank |
| 4,725,677 A | 2/1988 | Koster et al. |
| 4,800,159 A | 1/1989 | Mullis |
| 4,965,188 A | 10/1990 | Mullis |
| 4,999,294 A | 3/1991 | Looney |
| 5,047,524 A | 9/1991 | Andrus et al. |
| 5,104,789 A | 4/1992 | Permar |
| 5,104,792 A | 4/1992 | Silver |
| 5,132,215 A | 7/1992 | Jayarama |
| 5,143,854 A | 9/1992 | Pirrung et al. |
| 5,288,514 A | 2/1994 | Ellerman |
| 5,356,802 A | 10/1994 | Chandrasegaran |
| 5,384,261 A | 1/1995 | Winkler et al. |
| 5,405,783 A | 4/1995 | Pirrung |
| 5,424,186 A | 6/1995 | Fodor |
| 5,436,150 A | 7/1995 | Chandrasegaran |
| 5,436,327 A | 7/1995 | Southern |
| 5,445,934 A | 8/1995 | Fodor |
| 5,459,039 A | 10/1995 | Modrich |
| 5,474,796 A | 12/1995 | Brennan |
| 5,498,531 A | 3/1996 | Jarrell |
| 5,508,169 A | 4/1996 | Deugau et al. |
| 5,510,270 A | 4/1996 | Fodor et al. |
| 5,512,463 A | 4/1996 | Stemmer |
| 5,514,789 A | 5/1996 | Kempe |
| 5,527,681 A | 6/1996 | Holmes |
| 5,541,061 A | 7/1996 | Fodor |
| 5,605,793 A | 2/1997 | Stemmer |
| 5,624,711 A | 4/1997 | Sundberg |
| 5,639,603 A | 6/1997 | Dower et al. |
| 5,641,658 A | 6/1997 | Adams |
| 5,653,939 A | 8/1997 | Hollis |
| 5,674,742 A | 10/1997 | Northrup |
| 5,679,522 A | 10/1997 | Modrich |

(Continued)

FOREIGN PATENT DOCUMENTS

| | | |
|---|---|---|
| EP | 0259160 | 3/1988 |
| EP | 1015576 | 3/1999 |

(Continued)

OTHER PUBLICATIONS

Fidalgo et a, Surface induced droplet fusion in microfluic devices, 2007, Lab. Chip, 7, 984-986.*
Angell, et al., "Silicon Micromechanical Devices", Scientific American, 28:44-55 (1983).
Boal et al., "Cleavage of oligodeoxyribonucleotides from controlled-pore glass supports and their rapid deprotection by gaseous amines," NAR. 24(15): 3115-7 (1996).
Fidalgo L.M. et al. "Surface-induced droplet fusion in microfluidic devices" Lab on Chip Royal Society of Chemistry US. 7(8): 984-986 (2007).

(Continued)

*Primary Examiner* — Narayan Bhat
(74) *Attorney, Agent, or Firm* — Greenberg Traurig, LLP; Natalie Salem; Fang Xie

(57) ABSTRACT

Certain aspects of the present invention provide devices and methods for preparing oligonucleotides and for assembling nucleic acid molecules using microfluidic devices.

20 Claims, 4 Drawing Sheets

(56) References Cited

U.S. PATENT DOCUMENTS

| | | | |
|---|---|---|---|
| 5,695,940 A | 12/1997 | Drmanac | |
| 5,700,637 A | 12/1997 | Southern | |
| 5,700,642 A | 12/1997 | Monforte et al. | |
| 5,702,894 A | 12/1997 | Modrich | |
| 5,738,829 A | 4/1998 | Kempe | |
| 5,739,386 A | 4/1998 | Holmes | |
| 5,750,335 A | 5/1998 | Gifford | |
| 5,766,550 A | 6/1998 | Kaplan et al. | |
| 5,770,358 A | 6/1998 | Dower et al. | |
| 5,780,272 A | 7/1998 | Jarrell | |
| 5,795,714 A | 8/1998 | Cantor | |
| 5,830,655 A | 11/1998 | Monforte | |
| 5,830,721 A | 11/1998 | Stemmer | |
| 5,834,252 A | 11/1998 | Stemmer | |
| 5,858,754 A | 1/1999 | Modrich | |
| 5,861,482 A | 1/1999 | Modrich | |
| 5,871,902 A | 2/1999 | Weininger | |
| 5,877,280 A | 3/1999 | Wetmur | |
| 5,916,794 A | 6/1999 | Chandrasegaran | |
| 5,922,539 A | 7/1999 | Modrich et al. | |
| 5,928,905 A | 7/1999 | Stemmer | |
| 5,929,208 A | 7/1999 | Heller | |
| 5,942,609 A | 8/1999 | Hunkapiller | |
| 5,953,469 A | 9/1999 | Zhou | |
| 6,008,031 A | 12/1999 | Modrich et al. | |
| 6,013,440 A | 1/2000 | Lipshutz | |
| 6,017,696 A | 1/2000 | Heller | |
| 6,042,211 A | 3/2000 | Hudson et al. | |
| 6,093,302 A | 7/2000 | Montgomery | |
| 6,103,463 A | 8/2000 | Chetverin | |
| 6,136,568 A | 10/2000 | Hiatt | |
| 6,150,102 A | 11/2000 | Mills | |
| 6,150,141 A | 11/2000 | Jarrell | |
| 6,165,793 A | 12/2000 | Stemmer | |
| 6,177,558 B1 | 1/2001 | Brennan et al. | |
| 6,242,211 B1 | 6/2001 | Peterson | |
| 6,248,521 B1 | 6/2001 | Van Ness et al. | |
| 6,261,797 B1 | 7/2001 | Sorge | |
| 6,271,957 B1 | 8/2001 | Quate | |
| 6,277,632 B1 | 8/2001 | Harney | |
| 6,280,595 B1 | 8/2001 | Montgomery | |
| 6,284,463 B1 | 9/2001 | Hasebe | |
| 6,287,825 B1 | 9/2001 | Weissman | |
| 6,287,861 B1 | 9/2001 | Stemmer | |
| 6,291,242 B1 | 9/2001 | Stemmer | |
| 6,315,958 B1 | 11/2001 | Singh-Gasson | |
| 6,322,971 B1 | 11/2001 | Chetverin | |
| 6,333,153 B1 | 12/2001 | Fishel | |
| 6,346,399 B1 | 2/2002 | Weissman | |
| 6,358,712 B1 | 3/2002 | Jarrell | |
| 6,365,355 B1 | 4/2002 | McCutchen-Maloney | |
| 6,372,434 B1 | 4/2002 | Weissman | |
| 6,372,484 B1 | 4/2002 | Ronchi | |
| 6,375,903 B1 | 4/2002 | Cerrina et al. | |
| 6,406,847 B1 | 6/2002 | Cox | |
| 6,410,220 B1 | 6/2002 | Hodgson et al. | |
| 6,416,164 B1 | 7/2002 | Stearns et al. | |
| 6,426,184 B1 | 7/2002 | Gao | |
| 6,444,111 B1 | 9/2002 | Montgomery | |
| 6,444,175 B1 | 9/2002 | Singh-Gasson | |
| 6,479,652 B1 | 11/2002 | Crameri | |
| 6,480,324 B2 | 11/2002 | Quate | |
| 6,489,146 B2 | 12/2002 | Stemmer | |
| 6,495,318 B2 | 12/2002 | Harney | |
| 6,506,603 B1 | 1/2003 | Stemmer | |
| 6,511,849 B1 | 1/2003 | Wang | |
| 6,514,704 B2 | 2/2003 | Bruce et al. | |
| 6,521,427 B1 | 2/2003 | Evans | |
| 6,534,271 B2 | 3/2003 | Furste | |
| 6,537,776 B1 | 3/2003 | Short | |
| 6,565,727 B1 * | 5/2003 | Shenderov | 204/600 |
| 6,586,211 B1 | 7/2003 | Stahler et al. | |
| 6,596,239 B2 | 7/2003 | Williams et al. | |
| 6,605,451 B1 | 8/2003 | Marmaro | |
| 6,610,499 B1 * | 8/2003 | Fulwyler et al. | 435/7.1 |
| 6,613,581 B1 | 9/2003 | Wada | |
| 6,632,641 B1 | 10/2003 | Brennan | |
| 6,650,822 B1 | 11/2003 | Zhou | |
| 6,658,802 B2 | 12/2003 | Lucas, Jr. et al. | |
| 6,664,112 B2 | 12/2003 | Mulligan | |
| 6,664,388 B2 | 12/2003 | Nelson | |
| 6,670,127 B2 | 12/2003 | Evans | |
| 6,670,605 B1 | 12/2003 | Storm, Jr. et al. | |
| 6,800,439 B1 | 10/2004 | Mcgall et al. | |
| 6,802,593 B2 | 10/2004 | Ellson et al. | |
| 6,824,866 B1 | 11/2004 | Glazer et al. | |
| 6,830,890 B2 | 12/2004 | Lockhart et al. | |
| 6,833,450 B1 | 12/2004 | Mcgall et al. | |
| 6,846,655 B1 | 1/2005 | Wagner et al. | |
| 6,897,025 B2 | 5/2005 | Cox | |
| 6,911,132 B2 | 6/2005 | Pamula et al. | |
| 6,921,818 B2 | 7/2005 | Sproat | |
| 6,932,097 B2 | 8/2005 | Ellson et al. | |
| 6,969,587 B2 | 11/2005 | Taylor | |
| 6,969,847 B2 | 11/2005 | Davis | |
| 7,090,333 B2 | 8/2006 | Mutz et al. | |
| 7,129,091 B2 * | 10/2006 | Ismagilov et al. | 436/34 |
| 7,133,782 B2 | 11/2006 | Odedra | |
| 7,169,560 B2 | 1/2007 | Lapidus et al. | |
| 7,179,423 B2 | 2/2007 | Bohm | |
| 7,183,406 B2 | 2/2007 | Belshaw et al. | |
| 7,262,031 B2 | 8/2007 | Lathrop et al. | |
| 7,273,730 B2 | 9/2007 | DuBreuil | |
| 7,303,872 B2 | 12/2007 | Sussman | |
| 7,303,320 B1 | 1/2008 | Sussman | |
| 7,323,320 B2 | 1/2008 | Oleinikov | |
| 7,399,590 B2 | 7/2008 | Piepenburg | |
| 7,432,055 B2 | 10/2008 | Pemov | |
| 7,498,176 B2 | 3/2009 | McCormick et al. | |
| 7,563,600 B2 | 7/2009 | Oleinikov | |
| 7,820,412 B2 | 10/2010 | Bleshaw | |
| 7,879,580 B2 | 2/2011 | Carr | |
| 8,053,191 B2 | 11/2011 | Blake | |
| 8,058,004 B2 | 11/2011 | Oleinikov | |
| 8,173,368 B2 | 5/2012 | Staehler | |
| 8,716,467 B2 | 5/2014 | Jacobson | |
| 8,808,986 B2 | 8/2014 | Jacobson | |
| 9,023,601 B2 | 5/2015 | Oleinikov | |
| 9,051,666 B2 | 6/2015 | Oleinikov | |
| 2001/0012537 A1 | 8/2001 | Anderson et al. | |
| 2001/0031483 A1 | 10/2001 | Sorge | |
| 2001/0049125 A1 | 12/2001 | Stemmer | |
| 2002/0012616 A1 | 1/2002 | Zhou | |
| 2002/0037579 A1 | 3/2002 | Ellson et al. | |
| 2002/0058275 A1 | 5/2002 | Fishel | |
| 2002/0081582 A1 | 6/2002 | Gao et al. | |
| 2002/0127552 A1 | 9/2002 | Church | |
| 2002/0132259 A1 | 9/2002 | Wagner | |
| 2002/0132308 A1 | 9/2002 | Liu | |
| 2002/0133359 A1 | 9/2002 | Brown | |
| 2003/0017552 A1 | 1/2003 | Jarrell | |
| 2003/0044980 A1 | 3/2003 | Mancebo | |
| 2003/0047688 A1 | 3/2003 | Faris et al. | |
| 2003/0050437 A1 | 3/2003 | Montgomery | |
| 2003/0050438 A1 | 3/2003 | Montgomery | |
| 2003/0054390 A1 | 3/2003 | Crameri | |
| 2003/0068633 A1 | 4/2003 | Belshaw et al. | |
| 2003/0068643 A1 | 4/2003 | Brennan | |
| 2003/0082630 A1 | 5/2003 | Kolkman | |
| 2003/0087298 A1 | 5/2003 | Green | |
| 2003/0091476 A1 | 5/2003 | Zhou | |
| 2003/0099952 A1 | 5/2003 | Green | |
| 2003/0118485 A1 | 6/2003 | Singh-Gasson | |
| 2003/0118486 A1 | 6/2003 | Zhou | |
| 2003/0120035 A1 | 6/2003 | Gao | |
| 2003/0134807 A1 | 7/2003 | Hardin | |
| 2003/0143550 A1 | 7/2003 | Green | |
| 2003/0143724 A1 | 7/2003 | Cerrina | |
| 2003/0170616 A1 | 9/2003 | Wang | |
| 2003/0171325 A1 | 9/2003 | Gascoyne et al. | |
| 2003/0175907 A1 | 9/2003 | Frazer | |
| 2003/0186226 A1 | 10/2003 | Brennan et al. | |
| 2003/0198948 A1 | 10/2003 | Stahler | |
| 2003/0215837 A1 | 11/2003 | Frey | |

(56) References Cited

U.S. PATENT DOCUMENTS

| | | |
|---|---|---|
| 2003/0215855 A1 | 11/2003 | Dubrow |
| 2003/0215856 A1 | 11/2003 | Church |
| 2004/0002103 A1 | 1/2004 | Short |
| 2004/0005673 A1 | 1/2004 | Jarrell |
| 2004/0009479 A1 | 1/2004 | Wohlgemuth et al. |
| 2004/0009520 A1 | 1/2004 | Albert |
| 2004/0014083 A1 | 1/2004 | Yuan |
| 2004/0101444 A1 | 5/2004 | Sommers |
| 2004/0101894 A1 | 5/2004 | Albert et al. |
| 2004/0101949 A1 | 5/2004 | Green |
| 2004/0106728 A1 | 6/2004 | McGall et al. |
| 2004/0110211 A1 | 6/2004 | McCormick |
| 2004/0110212 A1 | 6/2004 | McCormick |
| 2004/0126757 A1 | 7/2004 | Cerrina |
| 2004/0132029 A1 | 7/2004 | Sussman |
| 2004/0166567 A1 | 8/2004 | Santi |
| 2004/0171047 A1 | 9/2004 | Dahl et al. |
| 2004/0185484 A1 | 9/2004 | Costa et al. |
| 2004/0241655 A1 | 12/2004 | Hwang |
| 2004/0259146 A1 | 12/2004 | Friend |
| 2005/0053997 A1 | 3/2005 | Evans |
| 2005/0069928 A1 | 3/2005 | Nelson |
| 2005/0074898 A1* | 4/2005 | Datwani et al. ............... 436/180 |
| 2005/0079510 A1 | 4/2005 | Berka et al. |
| 2005/0106606 A1 | 5/2005 | Parker |
| 2005/0118628 A1 | 6/2005 | Evans |
| 2005/0202429 A1 | 9/2005 | Trau et al. |
| 2005/0227235 A1 | 10/2005 | Carr |
| 2005/0255477 A1 | 11/2005 | Carr |
| 2006/0008833 A1 | 1/2006 | Jacobson |
| 2006/0040297 A1 | 2/2006 | Leamon et al. |
| 2006/0054503 A1 | 3/2006 | Pamula et al. |
| 2006/0127920 A1 | 6/2006 | Church |
| 2006/0127926 A1 | 6/2006 | Belshaw et al. |
| 2006/0134638 A1 | 6/2006 | Mulligan et al. |
| 2006/0160138 A1 | 7/2006 | Church |
| 2006/0194214 A1* | 8/2006 | Church et al. ............... 435/6 |
| 2007/0004041 A1 | 1/2007 | Church et al. |
| 2007/0052781 A1* | 3/2007 | Fraden et al. ............... 347/96 |
| 2007/0122817 A1 | 5/2007 | Church et al. |
| 2007/0231805 A1 | 10/2007 | Baynes |
| 2007/0281309 A1 | 12/2007 | Kong et al. |
| 2008/0009420 A1 | 1/2008 | Schroth |
| 2008/0014589 A1 | 1/2008 | Link et al. |
| 2008/0085513 A1* | 4/2008 | Leproust et al. ............... 435/6 |
| 2008/0105829 A1 | 5/2008 | Faris |
| 2008/0274513 A1* | 11/2008 | Shenderov et al. ........... 435/91.2 |
| 2008/0300842 A1 | 12/2008 | Govindarajan |
| 2009/0016932 A1* | 1/2009 | Curcio et al. ............... 422/68.1 |
| 2009/0878840 | 4/2009 | Baynes et al. |
| 2009/0137408 A1 | 5/2009 | Jacobson |
| 2009/0311713 A1 | 12/2009 | Pollack et al. |
| 2010/0015614 A1 | 1/2010 | Beer et al. |
| 2010/0015668 A1 | 1/2010 | Staehler et al. |
| 2010/0016178 A1 | 1/2010 | Sussman et al. |
| 2011/0008775 A1 | 1/2011 | Gao et al. |
| 2011/0117625 A1 | 5/2011 | Lippow et al. |
| 2011/0217738 A1 | 9/2011 | Jacobson |
| 2012/0028843 A1 | 2/2012 | Ramu |
| 2012/0220497 A1 | 8/2012 | Jacobson |
| 2012/0270754 A1 | 10/2012 | Blake |
| 2012/0283110 A1 | 11/2012 | Shendure |
| 2012/0315670 A1 | 12/2012 | Jacobson |
| 2012/0322681 A1 | 12/2012 | Kung |
| 2013/0059296 A1 | 3/2013 | Jacobson et al. |
| 2013/0059761 A1 | 3/2013 | Jacobson |
| 2013/0244884 A1 | 9/2013 | Jacobson |
| 2013/0252849 A1 | 9/2013 | Hudson |
| 2013/0281308 A1 | 10/2013 | Jacobson |
| 2013/0296192 A1 | 11/2013 | Jacobson |
| 2013/0296194 A1 | 11/2013 | Jacobson |
| 2013/0309725 A1 | 11/2013 | Jacobson |
| 2014/0141982 A1 | 5/2014 | Jacobson |
| 2014/0309119 A1 | 10/2014 | Jacobson |
| 2015/0065393 A1 | 3/2015 | Jacobson |

FOREIGN PATENT DOCUMENTS

| | | |
|---|---|---|
| EP | 1159285 | 9/2000 |
| EP | 1180548 | 2/2002 |
| EP | 1205548 | 5/2002 |
| WO | WO90/00626 | 1/1990 |
| WO | WO93/17126 | 9/1993 |
| WO | WO93/20092 | 10/1993 |
| WO | WO94/18226 | 8/1994 |
| WO | WO97/35957 | 10/1997 |
| WO | WO98/05765 | 2/1998 |
| WO | WO98/20020 | 5/1998 |
| WO | WO98/38326 | 9/1998 |
| WO | WO99/19341 | 4/1999 |
| WO | WO99/25724 | 5/1999 |
| WO | WO99/42813 | 8/1999 |
| WO | WO00/29616 | 5/2000 |
| WO | WO00/40715 | 7/2000 |
| WO | WO00/46386 | 8/2000 |
| WO | WO00/49142 | 8/2000 |
| WO | WO01/88173 | 11/2001 |
| WO | WO02/04597 | 1/2002 |
| WO | WO02/24597 | 3/2002 |
| WO | WO02/081490 | 10/2002 |
| WO | WO02/095073 | 11/2002 |
| WO | WO02/101004 | 12/2002 |
| WO | WO03/010311 | 2/2003 |
| WO | WO03/033718 | 4/2003 |
| WO | WO03/040410 | 5/2003 |
| WO | WO03/046223 | 5/2003 |
| WO | WO03/054232 | 7/2003 |
| WO | WO03/060084 | 7/2003 |
| WO | WO03/064611 | 7/2003 |
| WO | WO03/064026 | 8/2003 |
| WO | WO03/064203 | 8/2003 |
| WO | WO03/064699 | 8/2003 |
| WO | WO03/065038 | 8/2003 |
| WO | WO03/066212 | 8/2003 |
| WO | WO03/100012 | 12/2003 |
| WO | WO2004/002627 | 1/2004 |
| WO | WO2004/024886 | 3/2004 |
| WO | WO2004/029586 | 4/2004 |
| WO | WO2004/031351 | 4/2004 |
| WO | WO2004/031399 | 4/2004 |
| WO | WO2004/034028 | 4/2004 |
| WO | WO2004/090170 | 10/2004 |
| WO | WO2005/059096 | 6/2005 |
| WO | WO2005/071077 | 8/2005 |
| WO | WO2005/089110 | 9/2005 |
| WO | WO2005/107939 | 11/2005 |
| WO | WO2005/123956 | 12/2005 |
| WO | WO2006/044956 | 4/2006 |
| WO | WO2006/049843 | 5/2006 |
| WO | WO2006/076679 | 7/2006 |
| WO | WO2006/127423 | 11/2006 |
| WO | WO2007/008951 | 1/2007 |
| WO | WO2007/009082 | 1/2007 |
| WO | WO2007/075438 | 7/2007 |
| WO | WO2007/087347 | 8/2007 |
| WO | WO2007/113688 | 10/2007 |
| WO | WO2007/117396 | 10/2007 |
| WO | WO2007/120624 | 10/2007 |
| WO | WO2007/123742 | 11/2007 |
| WO | WO2007/136736 | 11/2007 |
| WO | WO2007/136833 | 11/2007 |
| WO | WO2007/136834 | 11/2007 |
| WO | WO2007/136835 | 11/2007 |
| WO | WO2007/136840 | 11/2007 |
| WO | WO2008/024319 | 2/2008 |
| WO | WO2008/045380 | 4/2008 |
| WO | WO2008/054543 | 5/2008 |
| WO | WO2008/076368 | 6/2008 |
| WO | WO2008/130629 | 10/2008 |
| WO | WO/2010/025310 | 3/2010 |
| WO | WO/2011/056872 | 5/2011 |
| WO | WO2011/066185 | 6/2011 |
| WO | WO2011/066186 | 6/2011 |
| WO | WO2011/085075 | 7/2011 |
| WO | WO2012/064975 | 5/2012 |

(56) References Cited

FOREIGN PATENT DOCUMENTS

| WO | WO2012/174337 | 12/2012 |
|---|---|---|
| WO | WO2013/032850 | 4/2013 |
| WO | WO2013/163263 | 10/2013 |
| WO | WO2014/004393 | 1/2014 |
| WO | WO2014/151696 | 9/2014 |
| WO | WO2014/160004 | 10/2014 |
| WO | WO2014/160059 | 10/2014 |

OTHER PUBLICATIONS

Shabarova et al., "Chemical ligation of DNA: the first non-enzymatic assembly of a biologically active gene," Nucl. Acids Res. 19:4247-51 (1991).
Teh et al. "Droplet microfluidics," Lab on a Chip. The Royal Society of Chemistry. 8(2): 198-220 (2008).
Whitesides G.M et al., "Soft Lithography in Biology and Biochemistry," Annual Review of Biomedical Engineering. 3:335-373 (2001).
Xia Y. and Whitesides G.M. "Soft lithography" Annual Review of Material Science. 28:153-184 (1998).
Xu et al., "A Novel 5'-Iodonucleoside Allows Efficient Nonenzymatic Ligation of Single-stranded and Duplex DNAs," Tetrahedron Lett. 38: 5595-5598 (1997).
Xu et al., "Nonenzymatic autoligation in direct three-color detection of RNA and DNA point mutations," Nat. Biotech. 19:148-52 (2001).
Xu et al., "High sequence fidelity in a non-enzymatic DNA autoligation reaction," Nuc. Acids Res. 27:875-81 (1999).
Zielke and Szymczyk, Eur. Phys. J. Special Topics, 166: 155-158 (2009).
Written Opinion for International Patent Application No. PCT/US2010/057392 mailed on May 30, 2012.
Adessi et al., "Solid phase DNA amplification: characterisation of primer attachment and amplification mechanisms," Nucleic Acids Research, 28(20):E87, (Oct. 15, 2000).
Afshari et al. "Application of Complementary DNA Microarray Technology to Carcinogen Identification, Toxicology, and Drug Safety". Cancer Research, 59, 4759-4760, Oct. 1, 1999.
Akhundova A.A. et al. "RNA synthesis on immobilized DNA templates in vitro." Biochemistry—Moscow, 43(5):626-628 (1978).
Altschul, S. & Koonin, E. "Iterated profile searches with PSI-BLAST—a tool for discovery in protein databases," Trends Biochem. Sci., 23:444-447, (1998).
Altschul, S., et al. "Basic local alignment search tool," J Mol Biol., 215(3):403-10, (Oct. 1990).
Beer, N., et al., "On-chip, real time single-copy polymerase chain reaction in picoliter droplets," Analytical Chemistry, 79(22):8471-8475, (Nov. 15, 2007).
Beier M. and Hohseil J.D. "Analysis of DNA-microarray produced by inverse in situ oligonucleotide synthesis." J. Biotechnology, 94:15-22 (2002).
Bethell, D., et al. "From monolayers to nanostructured materials: an organic chemist's view of self-assembly," J. Electroanal. Chem., 409:137-143, (1996).
Binkowski B. F. et al. "Correcting erros in synthetic DNA through consensus shuffling" Nucl. Acids Res., vol. 33, No. 6, e55, 2005.
Biswas I and Hsieh P., "Identification and characterization of a thermostable MutS homolog from Thermus aquaticus" Jour. Biol. Chem. 271:5040-5048, (1996).
Blanchard, A., "Synthetic DNA Arrays" In Genetic Engineering, vol. 20:111-123, Plenum Press, (1998).
Booth, P.M., et al. "Assembly and cloning of coding sequences for neurotrophic factors directly from genomic DNA using polymerase chain reaction and uracil DNA glycosylase," Gene 146:303-308 (1994).
Brown, Chappell "BioBricks to help reverse-engineer life," http://www.eetimes.com/General/displayPrintViewContent?contentItemId=4049196, Jun. 11, 2004.
Carr, P., et al. "Protein-mediated error-correction for de novo DNA synthesis," Nucleic Acids Research, 32(20), e162 (9 pages), (2004).
Caruthers et al., "CXV. Total synthesis of the structural gene for an alanine transfer RNA from yeast. Enzymic joining to form the total DNA duplex," J Mol Biol., 72(2):475-92, (Dec. 28, 1972).
Chalmers, F.P., et al. "Scaling Up the Ligase Chain Reaction-Based Approach to Gene Synthesis" BioTechniques 30:249-252 (2001).
Chan, L. et al. "Refactoring bacteriophage T7," Molecular Systems Biol., doi: 10.1038/msb4100025, (Published online Sep. 13, 2005).
Chang, C., et al. "Evolution of a cytokine using DNA family shuffling," Nature Biotechnology, 17: 793-797(1999).
Che, A. "BioBricks++: Simplifying Assembly of Standard DNA Components," [Online] XP002412778, URL:http://austinche.name/docs/bbpp.pdf (Jun. 9, 2004).
Chen, H.B., et al. "A new method for the synthesis of a structural gene," Nucleic Acids Research 18(4):871-878 (1990).
Cherepanov A "Joining of short DNA oligonucleotides with base pair mismatches by T4 DNA ligase" J Biochem. Jan. 2001;129(1):61-8.
Cho, S., et al. "Creating, transporting, cutting and merging liquid droplets by electrowetting-based actuation for digital microfluidic circuits," J. of Microelectromechanical Systems, 12(1):70-80, (Feb. 2003).
Christians, F., et al. "Directed evolution of thymidine kinase for AZT phosphorylation using DNA family shuffling," Nature Biotechnology, 17:259-264(1999).
Crameri, A, et al. "DNA shuffling of a family of genes from diverse species accelerates directed evolution," Nature, 391:288-291(1998).
Crameri, A, et al. "Improved Green Fluorescent Protein by Molecular Evolution Using DNA Shuffling," Nature Biotechnology, vol. 14, Mar. 1996, pp. 315-319.
Crameri, A, et al. "Molecular evolution of an arsenate detoxification pathway by DNA shuffling," Nature Biotechnology, 15:436-438 (1997).
Cui T. et al. "Sepharose-supported DNA as template for RNA synthesis" J. Biotechnology, 66: 225-228 (1998).
Duggan et al., "Expression profiling using cDNA microarrays" Nature Genetics, 21: 10-14, 1999.
Engler C. et al. "A one pot, one step, precision cloning method with high throughput capability" PLoS One, 3: e36471, 2008.
Engler C. et al. "Golden Gate Shuffling: a one-pot DNA shuffling method based on type IIS restriction enzymes" PLoS One, 4:e5553, 2009.
Evans, E. & Alani, E. "Roles for Mismatch Repair Factors in Regulating Genetic Recombination," Molecular & Cellular Biology, 20(21):7839-7844 (Nov. 2000).
Fair, R., "Digital microgluidics: is a true lab-on-a-chip possible?" Microfluid Nonofluid, 3:245-281, (2007).
Ferretti, L. et al. "Total synthesis of a gene for bovine rhodopsin," PNAS, 83:599-603 (Feb. 1986).
Ferrin, L.J., et al. "Sequence-specific ligation of DNA using RecA protein," Proc. Natl. Acad. Sci. USA, 95: 2152-2157 (1998).
Fleck, O. & Nielsen O. "DNA Repair," J. Cell Science, 117:515-517 (2004).
Fodor et al., "Light-Directed, Spatially Addressable Parallel Chemical Synthesis", Science, vol. 251, pp. 767-773 (1991).
Gao, X. et al. "Thermodynamically balanced inside-out (TBIO) PCR-based gene synthesis: a novel method of primer design for high fidelity assembly of longer gene sequences," Nucleic Acids Research, 31(22):e143 (11 pages) (2003).
Goler, J. "BioJADE: A Design and Simulation Tool for Synthetic Biological Systems," MIT Computer Science and Artificial Intelligence Laboratory, AI Technical Report, [Online] URL: http://dspace.mit.edu/bitstream/1721.1/30475/2/MIT-CSAIL-TR-2004-036.pdf, (May 2004).
Golz and Kemper, "Enzymatic mutation detection: enrichment of heteroduplexes from hybrid DNA mixtures by cleavage-deficient GST-tagged endonuclease VII" Nucleic Acids Research, 27(15):e7 (1999).
Grifith, E. and Aklella, S. "Coordinating Multiple Droplets in Planar Array Digital Microfluidic Systems," The International Journal of Robotics Research, 24(11):933-949, (Nov. 2005).
Gu et al., "Single Molecule Sensing by Nanopores and Nanopore Devices", Analysts, vol. 135, No. 3, pp. 441-451, (published online Dec. 2009).
Gulati S., et al., "Opportunities for microfluidic technologies in synthetic biology", Journal of the Royal Society, vol. 6, Suppl. 4, pp. S493-S506, 2009.

(56) References Cited

OTHER PUBLICATIONS

Hacia J.G. "Resequencing and mutational analysis using oligonucleotide microarrays", Nature Genetics, 21(1 suppl):42-47, 1999.
Hacia J.G. et al. "Applications of DNA chips for genomic analysis". Mol Psychiatry. Nov. 1998;3(6):483-92.
Haeberle, S. and Zengerle, R., "Microfluidic platforms for lab-on-chip applications," Lab on a Chip 7(9):1094-1110, (2007).
Hecker, K. "Error Analysis of Chemically Synthesized Polynucleotides," BioTechniques, 24(2):256-260, (Feb. 1998).
Jayaraman K. et al. "Polymerase chain reaction-mediated gene synthesis: synthesis of a gene coding for isozyme c of horseradish peroxidase." Proc Natl Acad Sci US A. May 15, 1991; 88(10): 4084-4088.
Kampke T. "Efficient primer design algorithms" Bioinformatics, 2001, vol. 17, No. 3, pp. 214-225.
Kelly, B., et al., "Miniaturizing chemistry and biology in microdroplets," Chem. Commun., 1773-1788, (2007).
Kim J.H. et al. "Solid-phase genetic engineering with DNA immobilized on a gold surface." J. Biotechnology, 96:213-22 (2002).
Kim, C., et al. "Biological lithography: Improvements in DNA synthesis methods," J. Vac. Sci. Technol. B 22(6):3163-3167 (2004).
Kitamura, K., et al. "Construction of Block-Shuffled Libraries of DNA for Evolutionary Protein Engineering: Y-Ligation-Based Block Shuffling." Protein Engineering, 15(10): 843-853, (Oct. 2002).
Kleppe K., et al. "Studies of polynucleotides: repair replication of short synthetic DNA's as catalyzed by DNA polymerases," J. Mol. Biol. 56:341-361, (1971).
Kodumal et al., "Total synthesis of long DNA sequences: Synthesis of a contiguous 32-kb polyketide synthase gene cluster," PNAS, 101(44):15573-15578, (Nov. 2, 2004).—15578.
Kong D., et al. "Parallel gene synthesis in a microfluidic device", Nucleic Acids Resarch, vol. 35, No. 8, pp. E61-E61, 2007.
Krieg A "Real-time detection of nucleotide incorporation during complementary DNA strand analysis" Chern. Bio. Chern. 4:589-592 (2003).
Kurian et al. "DNA chip technology". J Pathol.; 187(3):267-71, (Feb. 1999).
Lashkari et al. "An automated multiplex oligonucleotide synthesizer: Development of high throughpout, low cost DNA synthesis". PNAS 92(17): 7912-7915, (1995).
Lebedenko E.N. et al. "Method of artificial DNA splicing by directed ligation" Nucleic Acids Research, 19: 6757-6761, 1991.
Liu G. et al. "DNA computing on surfaces." Nature, 403:175179 (2000).
Liu, Y., et al., "DNA ligation of ultramicrovolume using EWOD microfluidic system with coplanar electrodes: DNA ligation of ultramicrovolume using a EWOD microfluidic system," J. of Micromechanics and Microengineering, 18(4):45017 (7 pages), (2008).
Markham, N. R. & Zuker, M., "DINAMelt web server for nucleic acid melting prediction", Nucleic Acids Res., 33, W577-W581, (2005.).
McGall et al., "Light-directed synthesis of high-density oligonucleotide arrays using semiconductor photoresists", Proc. Natl. Acad. Sci. U.S.A. 93:13555, (1996).
Milton, R., et al. "Total Chemical Synthesis of a D-Enzyme: The Enantiomers of HIV-1 Protease Show Demonstration of Reciprocal Chiral Substrate Specificity," Science, 256:1445-1448, (Jun. 5, 1992).
Mir K. U. et al. "Sequencing by cyclic ligation and cleavage (CycLic) directly on a microarray captured template". Nucl. Acids Rse. vol. 37, No. 1 e5, 2008.
Mitra R.D. et al. "Fluorescent in situ sequencing on polymerase colonies." Analytical Biochemistry, 320: 55-65 (2003).
Modrich, P. "Strand-specific Mismatch Repair in Mammalian Cells," J. Biol. Chem., 272(40): 24727-24730, (Oct. 3, 1997).
Moore, G. & Maranas C. "Computational Challenges in Combinatorial Library Design for Protein Engineering," AIChE Journal, 50(2):262-272, (Feb. 2004).

Ness, J., et al. "Synthetic Shuffling Expands Functional Protein Diversity by Allowing Amino Acids to Recombine Independently" Nature Biotechnology, 20:1251-1255, (Dec. 2002).
Nilsson P. et al. "Real-Time monitoring of DNA manipulations using biosensor technology" Analytical Biochemistry, 1995, 224:400-408.
Oleykowski CA et al., "Mutation detection using a novel plant endonuclease." Nucleic Acids Res. 26: 4596-4602, (1998).
Pon., R. "Solid-phase supports for oligonucleotide synthesis," Methods Mol. Biol., 20:465-496, (1993).
Richmond, K. E., et al., "Amplification and assembly of chip-eluted DNA (AACED): a method for high-throughput gene synthesis", Nucleic Acids Research, Oxford University Press, Surrey, GB, vol. 32, No. 17, pp. 5011-5018, Jan. 1, 2004.
Ryu, D.D.Y., et al. "Recent Progress in Biomolecular Engineering," Biotechnol. Prog. 16: 2-16 (2000).
Saiki, R., et al. "Analysis of enzymatically amplified beta-globin and HLA-DQ alpha DNA with allele-specific oligonucleotide probes," Nature, 324(6093):163-166, (Nov. 13, 1986).
Sgaramella, V., et al. "Studies of polynucleotides, C.: A novel joining reaction catalyzed by T4-polynucleotide ligase", PNAS, 67(3): 1468-1475, (Nov. 1970).
Smith, H.O., et al. "Generating a synthetic genome by whole genome assembly:<DX174 bacteriophage from synthetic oligonucleotides," PNAS, 100(26):15440-15445 (2003).
Smith, J. & Modrich, P. "Mutation Detection with MutH, MutL, and MutS Mismatch Repair Proteins," Proc. Natl. Acad. Sci. USA, 93:4374-4379, (Apr. 1996).
Soderlind et al. "Domain libraries: Synthetic diversity for de novo design of antibody V-regions." Gene, 160 (1995) 269-272.
Stamm et al., "Sanchored PCR: PCR with CDNA Coupled to a solid phase," Nucleic Acids Research, 19(6):1350, (Mar. 25, 1991).
Stekel D. "Microarrays: Making Them and Using Them in Microarray Bioinformatics," Microarray Bioinformatics, Cambridge University Press, 2003.
Stemmer et al. "Single-step assembly of a gene and entire plasmid from large numbers of oligodeoxyribonucleotides" Gene 164: 49 (1995).
Tian et al., "Accurate multiplex gene synthesis from programmable DNA microchips," Nature, 432:1050-1054, (Dec. 2004).
Tsutakawa, S. & Morikawa, K. "The Structural Basis of Damaged DNA Recognition and Endonucleolytic Cleavage for Very Short Patch Repair Endonuclease," Nucleic Acids Research, 29(18):3775-3783, (2001).
Weiler and Hoheisel "Combining the Preparation of Oligonucleotide Arrays and Synthesis of High-Quality Primers." Analytical Biochemistry, vol. 243, Issue 2, Dec. 15, 1996, pp. 218-227.
Wilgenbus & Lichter "DNA chip technology ante portas" J. Mol. Med 1999, 77:761-768.
Xiong et al. "PCR based accurate synthesis of long DNA sequences" Nature protocols 1 (2): 791 (2006).
Xiong, A., et al. "A simple, rapid, high-fidelity and cost-effective PCR-based two-step DNA synthesis method for long gene sequences," Nucleic Acids Research, 32(12):e98 (10 pages), (2004).
Zha, D., et al. "Assembly of Designed Oligonucleotides as an Efficient Method for Gene Recombination: A New Tool in Directed Evolution," ChemBioChem, 4: 34-39, (2003).
Zhao, H., et al. "Molecular Evolution by Staggered Extension Process (Step) In Vitro Recombination," Nature Biotechnology, 16:258-261, (Mar. 1998).
Zhou, X., et al., "Microfluidic PicoArray synthesis of oligodeoxynucleotides and simultaneous assembling of multiple DNA sequences", Nucleic Acids Research, vol. 32, No. 18, pp. 5409-5417, 2004.
International Preliminary Report on Patentability for International Patent Application PCT/US2010/057392 mailed on Jun. 7, 2012.
International Search Report for International Patent Application PCT/US2010/057392 mailed on Feb. 16, 2011.
International Search Report for International Patent Application PCT/US2011/020335 mailed on Jul. 19, 2011.
Andersen, J., et al. "New Unstable Variants of Green Fluorescent Protein for Studies of Transient Gene Expression in Bacteria," Applied and Environmental Microbiology, 64(6):2240-2246 (Jun. 1998).

(56) References Cited

OTHER PUBLICATIONS

Coco, W., et al. "Growth Factor Engineering by Degenerate Homoduplex Gene Family Recombination," Nature Biotechnology, 20: 1246-1250, (Dec. 2002).
Dafhnis-Calas, F., et al. "Iterative in vivo assembly of large and complex transgenes by combining the activities of DC31 integrase and Cre recombinase," Nucleic Acids Research, 33(22): 1-14 (2005).
Fisch, I. et al. "A Strategy of Exon Shuffling for Making Large Peptide Repertoires Displayed on Filamentous Bacteriophage," Proceedings of the National Academy of Sciences of USA, 93:7761-7766, (Jul. 1996).
Gardner, T., et al. "Construction of a genetic toggle switch in Escherichia coli," Nature, 403:339-342 (Jan. 2000).
Gibbs, W. "Synthetic Life," Scientific American, [Online] URL: htto://www.sciam.com/orint version.cfm?articleiD=0009FCA4, (Apr. 26, 2004).
Guntas, G., et al. "A molecular switch created by in vitro recombination of nonhomologous genes," Chem. & Biol., 11: 1483-1487 (Nov. 2004).
Guntas, G., et al. "Directed Evolution of Protein Switches and Their Application to the Creation of Ligand-Binding Proteins," Proc. Natl. Acad. Sci. USA, 102(32):11224-11229 (Aug. 9, 2005).
Heeb, S., et al. "Small, Stable Shuttle Vectors Based on the Minimal pVS1 Replicon for Use in Gram-Negative Plant-Associated Bacteria," MPMI, 13(2):232-237 (2000).
Johnston M. "Gene chips: Array of hope for understanding gene regulation". Current Biology, 8: (5) R171, 1998.
Jones, T., et al. "The Development of a Modified Human IFN-alpha2b Linked to the Fe Portion of Human IgG1 as a Novel Potential Therapeutic for the Treatment of Hepatitis C Virus Infection," Journal of Interferon & Cytokine Research, 24:560-572, (2004).
Kim, Y., et al. "Insertion and Deletion Mutants of FokI Restriction Endonuclease," J. Biol. Chem., 269(50):31978-31982 (1994).
Kolisnychenko, V., et al. "Engineering a Reduced Escherichia coli Genome," Genome Research, 12:640-647, (2002).
Kotsopoulou, E., et al. "A Rev-Independent Human Immunodeficiency Virus Type 1 (HIV-1)-Based Vector That Exploits a Codon-Optimized HIV-1 gag-pol Gene," Journal of Virology, 74(10):4839-4852, (May 2000).
Kowalczykowski, S. "Initiation of genetic recombination and recombination-dependent replication," TIBS, 25:156-165, (Apr. 2000).
Kowalczykowski, S. "In vitro reconstitution of homologous recombination reactions," Experientia, 50:204-215, (1994).
Lamers, M., et al. "ATP Increases the Affinity between MutS ATPase Domains," J. Biol. Chem., 279(42):43879-43885, (Oct. 15, 2004).
Leamon, J., et al., "A massively parallel PicoTiterPlate™ based platform for discrete picoliter-scale polymerase chain reactions," Electrophoresis, 24(21):3769-3777, (Nov. 2003).
Lee, K., et al. "Genetic approaches to Studying Protein Synthesis: Effects of Mutations at ΨI516 and A535 in Escherichia coli 16S rRNA," J. Nutr., 131:2994S-3004S, (2001).
Lewis, J. & Hatfull, G. "Control of directionality in intergrase-mediated recombination: examination of recombination directionality factors (RDFs) including Xis and Cox proteins," Nucl. Acids Res., 29(11):2205-2216 (2001).
Li, C., and Evans, R. "Ligation independent cloning irrespective of restriction site compatibility," Nucl. Acids Res., 25(20):4165-4166 (1997).
Li L et al. "Alteration of the cleavage distance of Fok I restriction endonuclease by insertion mutagenesis." Proc Natl Acad Sci USA. 90(7): 2764-2768 (Apr. 1993).
Link, A., et al. "Methods for generating precise deletions and insertions in the genome of wild-type Escherichia coli: Application to open reading frame characterization," J. Bacteriol., 179(20):6228-6237, (Oct. 1997).
Luo, P., et al. "Development of a Cytokine Analog with Enhanced Stability Using Computational Ultrahigh Throughput Screening," Protein Science, 11:1218-1226, (2002).
Lutz, S. & Benkovic, J. "Homology-Independent Protein Engineering," Current Opinion in Biotechnology, 11:319-324, (2000).

Mandecki W. "Oligonucleotide-directed double-strand break repair in plasmids of Escherichia coli: A method for site-specific mutagenesis." 1986, PNAS, 83:7177-7181.
Margulies, M., et al., "Genome sequencing in microfabricated high-density picolitre reactors," Nature, 437(7057):376-80, (Sep. 15, 2005).
Miick, S., et al. "Crossover isomer bias is the primary sequence-dependent property of immobilized Holliday junctions," Proc. Natl. Acad. Sci. USA, 94:9080-9084, (Aug. 1997).
Morton, Oliver "Life, Reinvented," Wired, http:www.wired.com/wired/archive!13.01/mit_pr.html (2005).
Nakamaye, K., et al. "Direct sequencing of polymerase chain reaction amplified DNA fragments through the incorporation of deoxynucleoside alpha-thiotriphosphates," Nucleic Acids Research, 16(21):9947-9959, (1988).
Ness, J., et al. "DNA shuffling of subgenomic sequences of subtilisin," Nature Biotechnology 17: 893-896 (1999).
Noirot, P. & Kolodner, R. "DNA Strand Invasion Promoted by Escherichia coli RecT Protein," J. Biol. Chemn., 273(20):12274-12280, (May 15, 1998).
Novy, R., et al. "Ligation Independent Cloning: Efficient Directional Cloning of PCR Products," Novagen, Inc., InNovations, 5: 1-3, http://www.emdbiosciences.com/html/NVG/inNovations.html), (1966).
Panet A. and Khorana G.H. "Studies of polynucleotides: the linkage of deoxyribopolynucleotides templates to cellulose and its use in their replication." J. Biol. Chem. 249(16):5213-5221 (1974).
Parr, R. & Ball, J. "New donor vector for generation of histidine-tagged fusion proteins using the Gateway Cloning System," Plasmid, 49:179-183, (2003).
Peters, J. & Craig, N. "Tn7: Smarter Than We Thought," Nature, 2:806-814, (Nov. 2001).
Posfai, G., et al. "In vivo excision and amplification of large segments of the Escherichia coli genome," Nucl. Acids Res., 22(12):2392-2398, (1994).
Posfai, G., et al. "Markerless gene replacement in Escherichia coli stimulated by a double-strand break in the chromosome," Nucl. Acids Res., 27(22):4409-4415, (1999).
Regalado, A. "Next Dream for Venter: Create Entire Set of Genes From Scratch," Wall Street Journal, A1, (Jun. 29, 2005).
Rouwendal, G., et al. "Enhanced Expression in Tobacco of the Gene Encoding Green Fluorescent Protein by Modification of its Codon Usage," Plant Molecular Biology, 33:989-999, (1997).
Sa-Ardyen, P., et al. "The flexibility of DNA double crossover molecules," Biophys. J., 84:3829-3837, (Jun. 2003).
Sakabe, N., et al. "A Bioinformatics Analysis of Alternative Exon Usage in Human Genes Coding for Extracellular Matrix Proteins," Genetics and Molecular Research, 3(4):532-544, (2004).
Saks, M. "Making sense out of nonsense," PNAS, 98(5): 2125-2127, (Feb. 27, 2001).
Sato, T., et al. "Production of menaquinone (vitamin K2)-7 by Bacillus subtilis," J. of Bioscience and Engineering, 91(1):16-20, (2001).
Schaerli, Y., et al., "Continuous-Flow polymerase Chain reaction of single-copy DNA Micorfluidic Microdroplets," Anal. Chem., 81: 302-306, (2009).
Semizarov, D., et al. "Stereoisomers of Deoxynucleoside 5'-Triphosphates as Substrates For Template-dependent and -independent DNA Polymerases," J. Biol. Chem., 272(14) 9556-9560 (1997).
Shao, Z., et al. "Random-Priming In Vitro Recombination: An Effective Tool for Directed Evolution," Nucleic Acids Research, 26(2):681-683, (1998).
Shendure, J., et al., "Accurate Multiplex Polony Sequencing of an Evolved Bacterial Genome," Science, 309:1728-1732, (Sep. 9, 2005).
Sieber, V., et al. "Libraries of Hybrid Proteins From Distantly Related Sequences," Nature Biotechnology, 19: 456-460, (May 2001).
Strizhov et al. "A synthetic cryiC gene, encoding a Bacillus Thuringiensis delta-endotoxin, confers Spodotera resistance in Alfafa and Tobacco" P.N.A.S., 1996, vol. 93, No. 26, pp. 15012-15017.

(56) References Cited

OTHER PUBLICATIONS

Tan, S., et al. "Zinc-finger protein-targeted gene regulation: Genomewide single-gene specificity," PNAS, 100(21):11997-12002, (Oct. 14, 2003).

Tang K. et al. "Chip-based genotyping by mass spectrometry." PNAS, 96:10016-10020 (1999).

von Neumann T. "The general and logical theory of automata," Pergamon Press, Taub A.H (Editor) vol. 5, 288-326 (1948).

Wheeler DL "Database resources of the National Center for Biotechnology Information" Nucleic Acids Res. 29(1): 11-6 (Jan. 2001).

Wiedmann, M., "Ligase chain reaction (LCR)—overview and applications", 3:S51-S64, http://genome.cshlp.org/content/3/4/S51.refs.html, Copyright 1994 by Cold Spring Harbor Laboratory.

Xuei et al. "Use of SAM(2)(R) biotin capture membrane in microarrayed compound screening (mu ARCS) format for nucleic acid polymerization assays" Journal of Biomolecular Screening 8:273-282 (2003).

Yolov et al. "RNA-synthesis by use of T7-RNA-Polymerase and immobilized DNA in a flowing-type reactor". Bioorganicheskaya Khimiya, 17:789-794 (1991) (English Abstract Only).

Zhang, C., et al., "PCR microfluidic devices for DNA amplification," Biotechnology Advances, 24(3):243-284, 2006.

* cited by examiner

MICROFLUIDIC DEVICES AND METHODS FOR GENE SYNTHESIS

RELATED APPLICATIONS

This application is a National Phase application of International Application No. PCT/US2010/057392, filed Nov. 19, 2010, which claims the benefit of U.S. provisional application Ser. No. 61/264,632, filed Nov. 25, 2009, the contents of each of the foregoing applications are hereby incorporated by reference in their entirety.

STATEMENT REGARDING FEDERALLY SPONSORED RESEARCH

This invention was made with United States Government support under the cooperative agreement number 70NANB7H7034N awarded by the National Institute of Standards and Technology. The United States Government has certain rights in the invention.

FIELD OF THE INVENTION

Methods and compositions of the invention relate to polynucleotide assembly and libraries of polynucleotide assembly, and particularly to the assembly of nucleic acids from shorter precursors within a microfluidic device.

BACKGROUND

Microfluidic devices and methods have been developed and used for a variety of analytical applications, including high throughput screening for drug discovery, gene expression analysis, and disease diagnosis. In the recent years, there has been a great interest in the use of microfluidic systems for synthetic biology applications. Accordingly, there is a need to develop microfluidic devices and methods for the synthesis of polynucleotides and reduce the cost, processing time and limit the use of reagents.

SUMMARY

Aspects of the invention relate to apparatuses for preparing and/or assembling macromolecules. Aspects of the invention provide microfluidic devices and methods for processing nucleic acid assembly reactions and assembling nucleic acids. Aspects of the invention relate to microfluidic devices comprising at least one main channel adapted to carry a carrier phase fluid comprising droplets that are immiscible with the carrier fluid, at least one surface-capture spot on the channel interior walls, wherein the capture spot surface property is different than the interior wall surface property. For example, the capture spot surface is more hydrophilic than the interior wall surface or the capture spot surface is more hydrophobic than the interior wall surface. The microfluidic device also comprises an inlet module upstream of the main channel and an outlet module downstream of the main channel. Preferably, the surface-capture spot comprises a surface area modification that affects the hydrophilic property of the surface-capture spot. In some embodiments, the main channel interior walls comprise an hydrophobic surface and a pattern of hydrophilic surface-capture spots and is adapted to carry a water-immiscible fluid such as oil. In a preferred embodiment, the channel interior walls comprise a plurality of surface-capture spots. In some preferred embodiment, the surface-capture spots comprise oligonucleotides. Preferably, the surface-capture spots form a high density oligonucleotide array. In a preferred embodiment, the microfluidic device comprises a main channel and a surface-capture module, wherein the surface capture module comprises a plurality of surface capture-spots and a force transducer. Force transducer may be an electric field, a magnetic field, a mechanical force, an optically induced force or any combination thereof.

Aspects of the invention provides for methods to prepare oligonucleotides for polynucleotide synthesis and assembly. In some embodiments, the surface capture comprises oligonucleotides and droplets are captured onto the surface capture spots. In some embodiments, the droplets are moved towards and captured onto the surface-capture spot by using a force transducer. In preferred embodiments, droplets are water-based droplets and the fluid carrier is a water-immiscible fluid. In some embodiments, the composition of the water-based droplets comprises reagents for amplification, error reduction, polymerase chain extension, ligation. For example, the water-based droplets comprises enzymes, buffer, dNTPs, primers, oligonucleotides, etc . . . In some embodiments, the oligonucleotides are amplified at the capture site. Droplets may then be moved using the force transducer to a different capture site for the washing, melting/annealing, error correction and assembly steps. Aspects of the invention relate to the merging of the droplets and to the mixing of the droplet composition. In some embodiments, droplets containing oligonucleotides may be merged with droplets containing the reagents necessary to perform amplification, assembly, and/or error correction steps. In some embodiments, an error correction step may be performed at a different capture site by mixing oligonucleotides or assembled nucleic acids with a MutS protein or a mismatch endonuclease.

DETAILED DESCRIPTION OF THE INVENTION

Figure 1A:
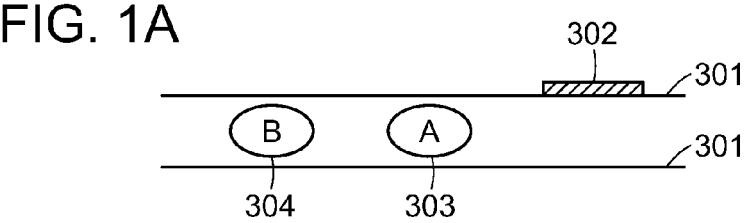
FIG. 1 is a schematic representation of an exemplary embodiment of fluidic channel enclosing spots comprising oligonucleotides.

Aspects of the invention relate to apparatuses for preparing and/or assembling macromolecules. Aspects of the invention provide microfluidic devices and methods for processing nucleic acid assembly reactions and assembling nucleic acids. Aspects of the invention may be useful for increasing the accuracy, yield, throughput, and/or cost efficiency of nucleic acid assembly reactions. In some embodiments, the invention provides one or more microfluidic devices that are configured for preparing and/or assembling nucleic acids. According to the invention, certain microfluidic device configurations may be useful to synthesize, isolate, purify, and/or concentrate one or more reagents and/or intermediates during nucleic acid assembly procedures.

A used herein a microfluidic device refers to a device for the manipulation of sub-picoliter to microliter volumes of liquid. In some embodiments, the devices feature channels, chambers, valves, inlet, outlet or any combination thereof.

The microfluidic device of the invention includes at least one fluid channel having a cross-sectional dimension of less than about 2 mm, less than 1 mm. A "microfluidic channel," as used herein, is a channel meeting these criteria. The "cross-sectional dimension" of the channel is measured perpendicular to the direction of fluid flow. Most fluid channels in components of the invention have maximum cross-sectional dimensions less than 2 mm, and in some cases, less than 1 mm. In one set of embodiments, all fluid channels containing embodiments of the invention are microfluidic or have a largest cross sectional dimension of no more than 2 mm or 1 mm. In another embodiment, the fluid channels may be formed in part by a single component (e.g. an etched substrate or molded unit). Of course, larger channels, tubes, chambers, reservoirs, etc., can be used to store fluids in bulk and to deliver fluids to components of the invention. In one set of embodiments, the maximum cross-sectional dimension of the channel(s) containing embodiments of the invention are less than 500 microns, less than 200 microns, less than 100 microns, less than 50 microns, or less than 25 microns. Microfluidic channels may be closed. However, in some embodiments, microfluidic substrates may include one or more open channels.

A variety of materials and methods, according to certain aspects of the invention, can be used to form the fluidic or microfluidic system. For example, various components of the invention can be formed from solid materials, in which the channels can be formed via micromachining, film deposition processes such as spin coating and chemical vapor deposition, laser fabrication, photolithographic techniques, etching methods including wet chemical or plasma processes, and the like. See, for example, *Scientific American,* 248:44-55, 1983 (Angell, et al). Technologies for precise and efficient fabrication of various fluidic systems and devices of the invention from silicon are known. In another embodiment, various components of the systems and devices of the invention can be formed of a polymer, for example, an elastomeric polymer such as polydimethylsiloxane ("PDMS"), polytetrafluoroethylene ("PTFE" or Teflon®), or the like. For instance, in some embodiments a system may be implemented by fabricating the fluidic system separately using PDMS or other soft lithography techniques (details of soft lithography techniques suitable for this embodiment are discussed in the references entitled "Soft Lithography," by Younan Xia and George M. Whitesides, published in the *Annual Review of Material Science,* 1998, Vol. 28, pages 153-184, and "Soft Lithography in Biology and Biochemistry," by George M. Whitesides, Emanuele Ostuni, Shuichi Takayama, Xingyu Jiang and Donald E. Ingber, published in the *Annual Review of Biomedical Engineering,* 2001, Vol. 3, pages 335-373; each of these references is incorporated herein by reference).

Different components can be fabricated of different materials. For example, a base portion including a bottom wall and side walls can be fabricated from an opaque material such as silicon or PDMS, and a top portion can be fabricated from a transparent or at least partially transparent material, such as glass or a transparent polymer, for observation and/or control of the fluidic process. In some embodiments, the channel walls are fabricated with a transparent polymer and such devices can be coupled to an optical detection system of, for example, fluorescence. Components can be coated so as to expose a desired chemical functionality to fluids that contact interior channel walls, where the base supporting material does not have a precise, desired functionality. For example, components can be fabricated as illustrated, with interior channel walls coated with another material. Material used to fabricate various components of the systems and devices of the invention, e.g., materials used to coat interior walls of fluid channels, may desirably be selected from among those materials that will not adversely affect or be affected by fluid flowing through the fluidic system, e.g., material(s) that is chemically inert in the presence of fluids to be used within the device (e.g., in the presence of nucleic acids such as single-stranded or double-stranded DNA, RNA, or other nucleic acids, and/or enzymes, and/or other reagents of the invention).

In some embodiments, the microfluidic devices comprise one or more reaction chambers. In some embodiments, devices may be used and/or designed to perform a plurality of parallel assembly reactions. Microfluidic devices use fluid flows in channels. The fluids are generally mixtures of chemical or biological compounds or reagents. Fluid may be a continuous phase fluid or may comprise monodispersed droplets. Assembly reagents, intermediates, and/or products may be drawn into a device, moved through channels and operational stations, and/or removed from a device using any suitable method (e.g., positive pressure, negative pressure, capillary action, electrical force, osmotic pressure, electroosmosis, acoustic liquid handling, etc., or any combination of two or more thereof).

One aspect of the invention relates to a microfluidic device for the synthesis of polynucleotides from oligonucleotides. In some embodiments, the device comprises one or more channels. In some embodiment, the devices and methods generate and/or utilize a discontinuous immiscible liquid/liquid interface. Preferably, the methods use microfluidic techniques to control the droplet size, the frequency and the composition of the droplets. In some aspects of the invention, methods and devices use a stream of sub-picolitre to microlitre droplets dispersed within an immiscible continuous phase. This way, the droplets define a sub-picolitre to microlitre volumes with a known and controllable composition. One should appreciate that the ability to confine the reagents within a droplet volume in an immiscible environment has several advantages, such as elimination of hydrodynamic dispersion, elimination of evaporation of the aqueous phase, parallel processing, easy mixing and merging of the droplets. In the case of aqueous droplets, the volumes contain aqueous reagents including, but is not limited to, water, buffer, primers, master mix, release chemicals, enzymes, oligonucleotides, polymers or any combination thereof. In an exemplary embodiment, the droplets are water-based droplets and are dispersed in water-immiscible phase such as oil, short chain hydrocarbons, etc . . . Yet in another embodiment, the droplets are oil-based and are dispersed in an oil-immiscible phase such as water-based fluid. Yet in another embodiment, the droplets are composed of two hydrogel phases that may be miscible or immiscible (such as a hydrophilic side and an organophillic side). For example, the droplets may be an oil-water-oil double-emulsion droplets.

One skilled with the art will appreciate that depending on the composition of the droplets, the interior channel walls may be hydrophobic if the droplets are water-based or hydrophilic if the droplets are oil-based. The microfluidic channels may be fabricated from a variety of materials. Materials of interest include, but are not limited to, polydimethylsiloxane (PDMS), and glass. Where a hydrophilic interior surface is desired, microfluidic structures of the invention (or interior, fluid-contacting surfaces) may be formed from oxidized silicone polymers. In some embodiments, due to the fabrication technology selected (PDMS and glass), extensive PDMS surface passivation and conditioning may be necessary to prevent loss of nucleic acids that would reduce the yield of assembled products during the assembly process. In some embodiments, the absorbing nature of the PDMS may render a device non-reusable since previously amplified DNA will be embedded into the device walls after a reaction. Accordingly, although the PDMS-on-glass technology is less expensive (compared to glass-on-glass), and hence more disposable, the conditioning steps and the replacement of chips after each reaction makes this approach more expensive for a fully automated operation. In contrast, a glass-on-glass fabrication technology produces fluidic substrates that do not require passivation and are reusable.

It is a well-known phenomenon that the surfaces of most normally solid substrates, when contacted with a solution, have a characteristic degree of wettability or non-wettability (i.e. different hydrophilic properties). That is, according to the wettability properties of the surface, the aqueous solutions will flow or attach to the sidewalls of the channel. Accordingly, the interior channel walls may be configured to comprise one or more surface-capture spots or patches having surface properties that allow droplet absorption or attachment when small volumes comes into contact of the patch(s). In some embodiments, the interior channel walls may be unmodified. Yet in other embodiments, the interior channel walls may be chemically coated to be hydrophobic or to be hydrophilic. In some embodiments, molecules may be grafted to specific regions of the channel interior wall to render spots hydrophilic if the droplet is water-based or hydrophobic if the droplets are oil-based. In preferred embodiments, the interior channel walls comprises at least one spot or patch that is hydrophilic if the droplet is water-based or hydrophobic if the droplet is oil-based. Preferably, the interior channel walls comprise a plurality of surface-capture spots or patches.

FIG. 1 is a schematic representation of an exemplary embodiment of a microfluidic channel comprising a patch (302) that is hydrophilic whereas the remaining interior wall surface is hydrophobic. Referring to FIG. 1, fluidic channel 301 encloses a modifier surface or patch 302. The channel is filled with an immiscible fluid. In an exemplary embodiment, the immiscible fluid is oil-based and the channels sidewalls are hydrophobic to avoid the absorption or attachment of the water-based droplets 304 and 303. Droplets 303 and 304 are insulated from the each others and from the channel interior walls by the immiscible fluid. In an exemplary embodiment, the modifier or surface capture spot is hydrophilic. After production of the droplets, the trajectory of the droplet in the channel is determined by several elements such as flow of the carrier immiscible fluid and the geometry of the channels. Microfluidic flow is governed by viscous and interfacial forces and the flow pattern may be represented by the equation wherein C is the capillary number.

$$C = \text{viscous forces/interfacial forces}$$

The flow pattern may be modified by increasing or decreasing the interfacial forces between the two fluidic phases (carrier and droplet) by addition of surfactants.

Figure 1B:
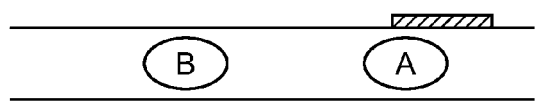
Figure 1C:
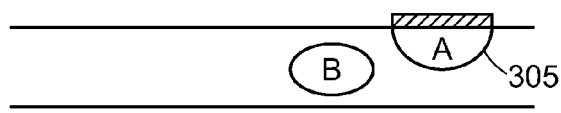
Figure 1D:
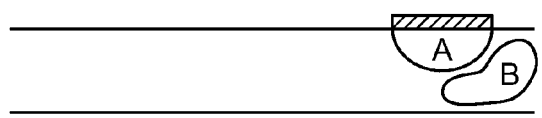
Figure 1E:

As shown in FIG. 1B, as droplet A (303) flows closely to the modifier or surface-capture spot, the droplet may be captured on the modifier surface. Once droplet 303 contacts the modifier surface 302, the surface tension of the patch or modifier can capture and retain the droplet (305). Droplet movement is controlled by the flow rates of the fluid in the device or by electrical, magnetic, mechanical action applied to the droplets. The droplets and/or the fluid within the microfluidic device can be transported and distributed by a variety of forces including electric forces, electrokinetic forces, pressure based flow techniques, capillary forces, thermo-capillary forces, gravitational and centrifugal forces, magnetic field, a mechanical force, including mechanical pressure waves such as sound waves or ultrasound, or an optical induced force or any combination thereof. Optically induced forces may be an optical trap or optical tweezers. These forces may be used to control the trajectory of the droplet and its displacement to a predefined region such as the modifier region or patch. The electrokinetic forces encompass both electro-osmotic and electrophoretic forces. These forces are best applied when the fluids and compounds to be transported have an electrostatic component. Electrostatic forces can be applied by standard electric circuitry. These techniques are known to people of ordinary skill in the art. Pressure based flow techniques encompass both vacuum and pressurized gas. Pressure and vacuum can be regulated by standard techniques including valves, vacuum pumps and pistons. Centrifugational forces can be applied by spinning the microfluidic device in a centrifuge. Fluid flow volumes and rates through microfluidic channels may be optimized for different applications. In some embodiments, flow rates between 0.1 nl and 1 µl per second may be used (e.g., rates of about 1 nl, about 10 nl, about 100 nl, or about 1 µl per second). However, lower rates (less than 1 nl per second) or higher rates (e.g., about 5-10 µl per second or higher) may be used depending on the application. In an exemplary embodiment, the droplets may comprise a buffer with diluted magnetic beads and the droplets may be moved using permanent or electro-magnet. Magnetic beads may be between less than 1 nm, less than 10 nm, less than 100 nm, less than 1 um in diameter. Magnetic beads may be obtained from any suitable source (e.g., Ferrotec (USA)).

In some embodiments, droplets may be routed using electrowetting-based techniques (see for example, U.S. Pat. No. 6,911,132 and U.S. Patent Application 2006/0054503). Electrowetting principle is based on manipulating droplets on a surface comprising an array of electrodes and using voltage to change the interfacial tension. In some embodiments, droplets are moved using a wettability gradient. It has been shown that droplets placed on wettability gradient surfaces typically move in the direction of increasing wettability (see Zielke and Szymczyk, Eur. Phys. J. Special Topics, 166, 155-158 (2009)). Some aspects of the invention relate to the droplet-based liquid handling and manipulation methods by implementing electrowetting-based techniques. In some embodiments, the microfluidics device comprises two primary supports or substrates, wherein one substrate comprises electrodes forming a reaction chamber or channel.

Figure 2A:
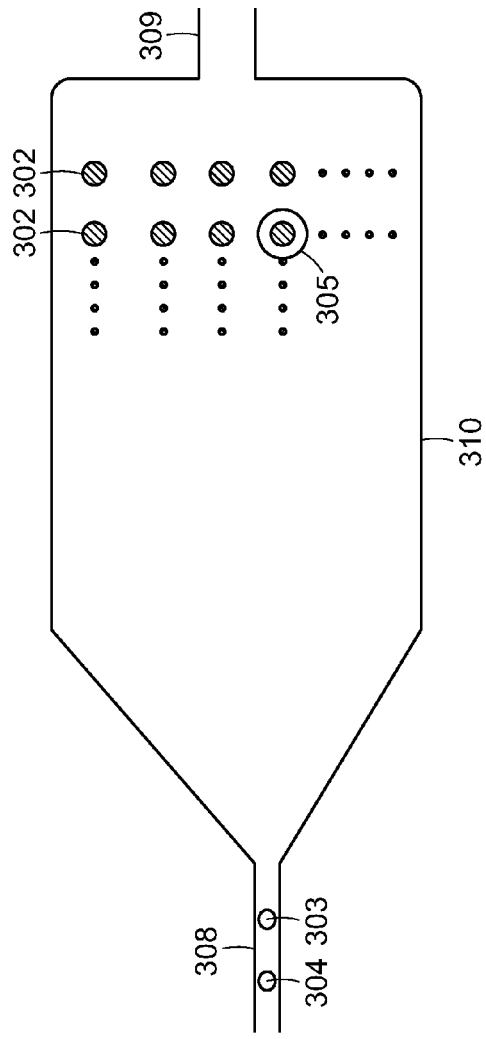
FIG. 2A is a schematic representation of an exemplary embodiment of a fluidic chamber comprising a set of surface-capture spots.

As shown in FIG. 2A, the channel interior wall surface comprises a pattern of spots or patches. Patches may comprise one or more modifier having different wettability or hydrophilic properties and surface tension properties. In some embodiments, all modifiers in the reaction chamber are the same. Yet in other embodiments, the modifiers may have different properties such as different surface tension properties. Exemplary patterning (or partitioning) of the surface is shown in FIG. 2A. Modifiers can have circular, square, trapezoid, or any geometrical shape or any combination thereof. In some embodiments, modifiers are arranged in a grid-like pattern or in any other different configurations. However, the pattern is not restricted to any design. For example, the modifiers may be arranged in a randomly formed pattern. Patterning may be formed by any process known in the art. For example, arranged patterning or random patterning may be formed by processes such as block co-polymer surface self assembly. In other embodiments, the channel interior wall surface is partitioned into regions by at least two different modifiers regions as discussed herein. In the context of aqueous solutions, the modifiers surfaces may be more hydrophilic than the surface of the non-modifiers regions. Alternatively, the modifiers surfaces may be more hydrophobic than the surface of the non-modifiers surface regions. In an exemplary embodiment, modifiers are oligonucleotides and the surface of the modifier regions is more hydrophilic than the surface of the non-modifier regions. In some embodiments, the modifiers are oligomers. For example, the modifiers correspond to nucleic acids and are modifying a set of discrete spots on the channels sidewalls. Accordingly, the patch regions may comprise oligonucleotides. Preferably, the channel sidewalls may be comprising a plurality of patches comprising a plurality of different oligonucleotides.

In some embodiments, the channels sidewalls comprise a plurality of different members of a high diversity library. In exemplary embodiments, as illustrated in FIG. 2, the channels sidewalls (311) comprise an oligonucleotide array. In a preferred embodiment, the oligonucleotide spots correspond to an oligonucleotide or DNA array and the array is interfaced to the microfluidic channel and reaction chamber (310). Arrays may be interfaced to the microfluidic device by pressure binding, adhesive bonding or any other methods known in the art. Preferably, the oligonucleotides have a predefined sequence. As used herein, the term "predefined sequence" means that the sequence of the polymer is known and chose before synthesis or assembly of the polymer. In particular, aspects of the invention is described herein primarily with regard to the preparation of nucleic acids molecules, the sequence of the oligonucleotide or polynucleotide being known and chosen before the synthesis or assembly of the nucleic acid molecules. In some embodiments of the technology provided herein, immobilized oligonucleotides or polynucleotides are used as a source of material. In various embodiments, the methods described herein use oligonucleotides, their sequence being determined based on the sequence of the final polynucleotides constructs to be synthesized. In one embodiment, "oligonucleotides" are short nucleic acid molecules. For example, oligonucleotides may be from 10 to about 300 nucleotides, from 20 to about 400 nucleotides, from 30 to about 500 nucleotides, from 40 to about 600 nucleotides, or more than about 600 nucleotides long. However, shorter or longer oligonucleotides may be used. Oligonucleotides may be designed to have different length. In some embodiments, the sequence of the polynucleotide construct may be divided up into a plurality of shorter sequences that can be synthesized in parallel and assembled into a single or a plurality of desired polynucleotide constructs using the methods described herein. As used herein the term "array" refers to an arrangement of discrete features for storing, routing, amplifying and releasing oligonucleotides or complementary oligonucleotides for further reactions. In a preferred embodiment, the support or array is addressable: the support includes two or more discrete addressable features at a particular predetermined location (i.e., an "address") on the support. Therefore, each oligonucleotide molecule of the array is localized to a known and defined location on the support. The sequence of each oligonucleotide can be determined from its position on the support. Moreover, addressable supports or arrays enable the direct control of individual isolated volumes such as droplets. The size of the defined feature is chosen to allow formation of a microvolume droplet on the feature, each droplet being kept separate from each other. Oligonucleotides are attached, spotted, immobilized, surface-bound, supported or synthesized on the discrete features of the surface or array as described above. Oligonucleotides may be covalently attached to the surface or deposited on the surface. Various methods of construction are well known in the art e.g. maskless array synthesizers, light directed methods utilizing masks, flow channel methods, spotting methods etc.

Figure 2B:
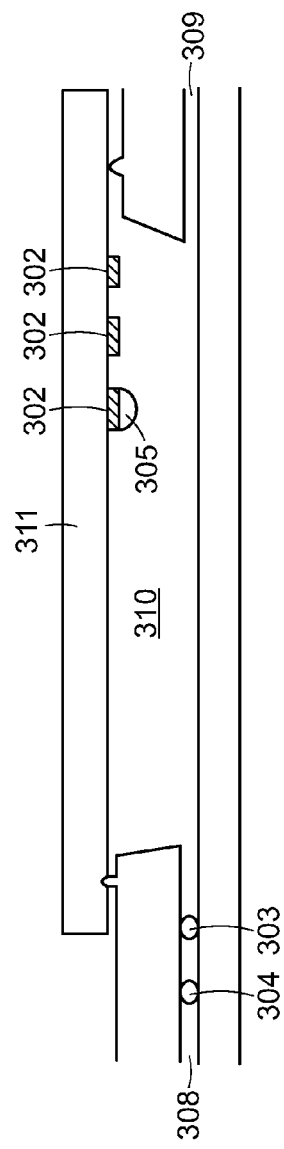
FIG. 2B is a schematic representation of an exemplary embodiment of a fluidic chamber in cross section view.

FIG. 2A is a schematic representation of an example embodiment of a fluidic channel or reaction chamber (310) enclosing a set of spots of oligonucleotides (302) that may be used for the synthesis of a polynucleotide of a predefined sequence. In this exemplary embodiment, a two-dimensional array of spots 302, each carrying at least one member of the high diversity library, can be used to capture droplets (305). As described above, the location of the capture can be determined by an external force. By coinciding the application of the external force with the physical alignment of the droplet to the spots (302), it is possible to control the deposition position of the captured droplet (305). FIG. 2B shows a cross section of the reaction chamber (310) and the high density high diversity library.

Figure 3A:
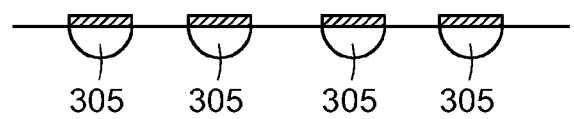
FIG. 3 is a schematic representation of an exemplary embodiment of droplet manipulation.
Figure 3B:
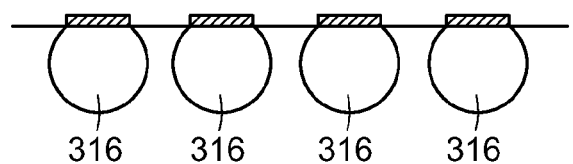
Figure 3C:
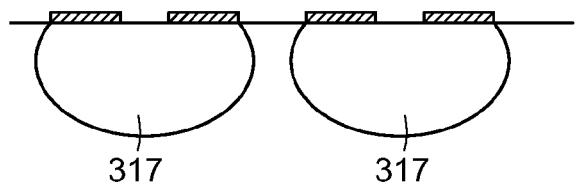
Figure 3D:
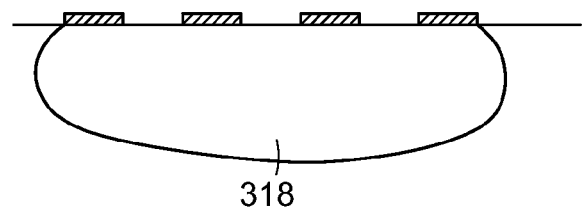
Figure 4A:
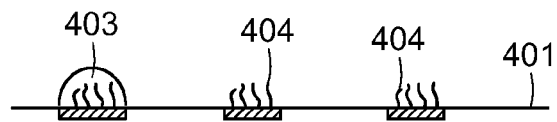
FIG. 4 illustrates an exemplary method using an immiscible fluid system in polynucleotide assembly.
Figure 4B:
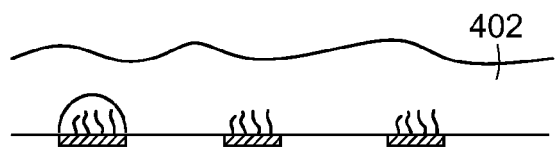
Figure 4C:
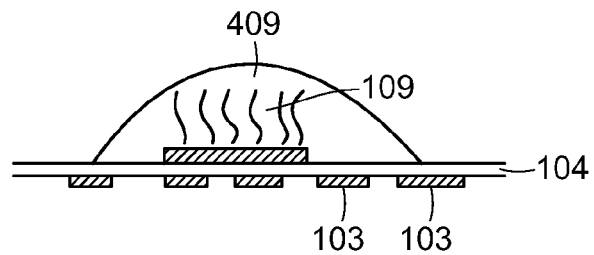
Figure 4D:
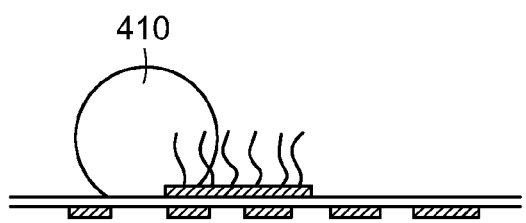

Aspects of the invention relate to the mixing and merging of the droplets. In some embodiments, the methods described herein can be used to add multiple droplets to the same spot and increase the volume of the initial droplet captured on the spot. This process allows for more complex manipulation of the droplets and reactions. In an exemplary embodiment, droplets are added to a selected spot, allowing droplet to merge. Aspects of the methods are exemplified in FIG. 3. FIG. 3A is a schematic representation of a fluidic chamber enclosing a set of four captured droplets (305) on different spots. In some embodiments, additional droplets may be produced and added to each of the spots or to a selected number of spots, thereby creating larger droplets (316). Additional droplets may be produced and added to each of the spots or to a selected number of spots, thereby creating larger droplets (317) and so on. One will appreciate that by controlling the location of the addition, it is possible to control the volume of each droplet and enable the merging of adjacent droplets (FIG. 3C and 3D).

An immiscible fluid system, such as oil and aqueous reagents, can be used to achieve passivation of sites on which reactions take place. As shown in FIG. 4, a droplet of oil (or a short chain hydrocarbon) can first be deposited on a site (403) where reaction is undesirable. After the oil deposition, subsequent fluid processing steps will affect only the unprotected sites or features (404), but not the protected sites or features (403) since the fluid (402), cannot reach the surface of the protected site (403). This concept can be further extended to allow controlled exposure or protection at the oil covered spots (403). By using electrowetting concepts, the shape of an oil droplet can be modulated by the appropriate application of electric field. The surface droplet shape can be modulated from its normal state (409) to its actuated state (410) by electrowetting or optoelectrowetting. The effect of such control allows the exposure of a portion or the totality of the feature (109) depending on the applied field.

In some embodiments, a microfluidic device comprises a reaction chamber, an inlet (or sipper, 308, FIG. 2) and/or an outlet (or spitter, 309, FIG. 2). Reaction chambers of the invention may have a surface area of between about 1 mm$^2$ and about 100 mm$^2$ with volumes of between 10 nl and about 10 μl. However, other dimensions and volumes may be used as the invention is not limited in this respect. Similarly, the cross-sectional shapes of the reaction chambers may be any suitable shape (e.g., round, oval, rectangular, trapezoid, triangular, irregular, etc., or any combination thereof) and are not limited by the shapes shown in the figures. When aspects of the invention are described herein in connection with a sipper, it should be appreciated that any suitable collection port or other means for transferring components into a microfluidic device may be used as a substitute for the sipper. A sipper can be an integral part of the microfluidic device. The sipper can transfer components to the top of the fluid device, to the bottom or directly into channels of the device. Alternatively, the sipper can be attached and detached from the microfluidic device when desired. A sipper can comprise a channel, a pipettor, a tube or any other means for moving a liquid or solid component into the microfluidic device. In some embodiments, the function of the sipper can be performed by an acoustic liquid handler (e.g., an acoustic droplet ejector). Transportation can be performed by fluid pressure, gas pressure, vacuum pressure, electronic modulators or physical means, like a piston directly pushing the component into the microfluidic device. The fluid, liquid, reagent, chemical or solid to be transferred can be transferred from vials, plates, slides, microfluidic devices or any device that can hold a liquid, fluid, chemical or solid. In some embodiments the microfluidic device comprises a spitter. When aspects of the invention are described herein in connection with a spitter, it should be appreciated that any suitable distribution or dispensing port or means for transferring a fluid, liquid, reagent, chemical or solid from the microfluidic device into another device that can contain said fluid, liquid, reagent, chemical or solid may be used as a substitute for the spitter. A spitter can be an integral part of the microfluidic device. In some embodiments, the function of the spitter can be performed by an acoustic liquid handler (e.g., an acoustic droplet ejector). The spitter can transfer fluid, liquid, reagent, chemical or solid from the top of the fluid device, from the bottom or directly from the channels or wells, columns or other elements of the device. Alternatively, the spitter can be attached and detached from the microfluidic device when desired. A spitter can comprise a channel, a pipettor, a tube or any other means for moving a fluid, liquid, reagent, chemical or solid into the microfluidic device. Transportation can be performed by fluid pressure, gas pressure, vacuum pressure, electronic modulators or physical means, like a piston directly pushing the component into the microfluidic device. In some embodiments fluid, liquid, reagent, chemical or solid are transferred from the microfluidic device directly. Non-limiting examples of transferring methods are direct pipetting, pressure based displacement methods, and centrifugation or gravity based methods.

It should be apparent from the present description that a microfluidic device of the invention may comprise different combinations of operational reaction chambers connected via one or more channels in an architecture that may be adapted for a particular assembly, analysis, monitoring, error-removal, or other processing of nucleic acids (e.g., during assembly). One would appreciate aspects of the methods and devices may be used to implement polymer assembly such as polynucleotide assembly. In some embodiments, multiple reaction chambers may be connected to use for polynucleotide assembly. For example, large polynucleotides may be synthesized by assembly shorter nucleic acid fragments in a hierarchical assembly strategy. In some embodiments, each shorter nucleic acid fragment may be synthesized in the same reaction chamber. Yet in other embodiments, each shorter nucleic acid fragment may be synthesized in parallel a separate reaction chamber and nucleic acid fragments may then be introduced into a subsequent reaction chamber for the assembly of the final product. It should be apparent that many variations upon the method of hierarchical polynucleotide synthesis are possible.

As used herein the terms "nucleic acid", "polynucleotide", "oligonucleotide" are used interchangeably and refer to naturally-occurring or synthetic polymeric forms of nucleotides. The oligonucleotides and nucleic acid molecules of the present invention may be formed from naturally occurring nucleotides, for example forming deoxyribonucleic acid (DNA) or ribonucleic acid (RNA) molecules. Alternatively, the naturally occurring oligonucleotides may include structural modifications to alter their properties, such as in peptide nucleic acids (PNA) or in locked nucleic acids (LNA). The solid phase synthesis of oligonucleotides and nucleic acid molecules with naturally occurring or artificial bases is well known in the art. The terms should be understood to include equivalents, analogs of either RNA or DNA made from nucleotide analogs and as applicable to the embodiment being described, single-stranded or double-stranded polynucleotides. Nucleotides useful in the invention include, for example, naturally-occurring nucleotides (for example, ribonucleotides or deoxyribonucleotides), or natural or synthetic modifications of nucleotides, or artificial bases. As used herein, the term monomer refers to a member of a set of small molecules which are and can be joined together to from an oligomer, a polymer or a compound composed of two or more members. The particular ordering of monomers within a polymer is referred to herein as the "sequence" of the polymer. The set of monomers includes but is not limited to example, the set of common L-amino acids, the set of D-amino acids, the set of synthetic and/or natural amino acids, the set of nucleotides and the set of pentoses and hexoses. Aspects of the invention described herein primarily with regard to the preparation of oligonucleotides, but could readily be applied in the preparation of other polymers such as peptides or polypeptides, polysaccharides, phospholipids, heteropolymers, polyesters, polycarbonates, polyureas, polyamides, polyethyleneimines, polyarylene sulfides, polysiloxanes, polyimides, polyacetates, or any other polymers.

As used herein, the term "predefined sequence" means that the sequence of the polymer is known and chose before synthesis or assembly of the polymer. In particular, aspects of the invention is described herein primarily with regard to the preparation of nucleic acids molecules, the sequence of the oligonucleotide or polynucleotide being known and chosen before the synthesis or assembly of the nucleic acid molecules. In some embodiments of the technology provided herein, immobilized oligonucleotides or polynucleotides are used as a source of material. In various embodiments, the methods described herein use oligonucleotides, their sequence being determined based on the sequence of the final polynucleotides constructs to be synthesized. In one embodiment, "oligonucleotides" are short nucleic acid molecules. For example, oligonucleotides may be from 10 to about 300 nucleotides, from 20 to about 400 nucleotides, from 30 to about 500 nucleotides, from 40 to about 600 nucleotides, or more than about 600 nucleotides long. However, shorter or longer oligonucleotides may be used. Oligonucleotides may be designed to have different length. In some embodiments, the sequence of the polynucleotide construct may be divided up into a plurality of shorter sequences that can be synthesized in parallel and assembled into a single or a plurality of desired polynucleotide constructs using the methods described herein.

In some embodiments, the assembly procedure may include several parallel and/or sequential reaction steps in which a plurality of different nucleic acids or oligonucleotides are synthesized or immobilized, amplified, and are combined in order to be assembled (e.g., by extension or ligation as described herein) to generate a longer nucleic acid product to be used for further assembly, cloning, or other applications (see PCT Applications No PCT/US2009/55267 and PCT/US2010/055298, which are incorporate herein by reference in their entireties). Amplification and assembly strategies provided herein can be used to generate very large libraries representative of many different nucleic acid sequences of interest.

In some embodiments, methods of assembling libraries containing nucleic acids having predetermined sequence variations are provided herein. Assembly strategies provided herein can be used to generate very large libraries representative of many different nucleic acid sequences of interest. In some embodiments, libraries of nucleic acid are libraries of sequence variants. Sequence variants may be variants of a single naturally-occurring protein encoding sequence. However, in some embodiments, sequence variants may be variants of a plurality of different protein-encoding sequences.

Accordingly, one aspect of the technology provided herein relates to the design of assembly strategies for preparing precise high-density nucleic acid libraries. Another aspect of the technology provided herein relates to assembling precise high-density nucleic acid libraries. Aspects of the technology provided herein also provide precise high-density nucleic acid libraries. A high-density nucleic acid library may include more that 100 different sequence variants (e.g., about $10^2$ to $10^3$; about $10^3$ to $10^4$; about $10^4$ to $10^5$; about $10^5$ to $10^6$; about $10^6$ to $10^7$; about $10^7$ to $10^8$; about $10^8$ to $10^9$; about $10^9$ to $10^{10}$; about $10^{10}$ to $10^{11}$; about $10^{11}$ to $10^{12}$; about $10^{12}$ to $10^{13}$; about $10^{13}$ to $10^{14}$; about $10^{14}$ to $10^{15}$; or more different sequences) wherein a high percentage of the different sequences are specified sequences as opposed to random sequences (e.g., more than about 50%, more than about 60%, more than about 70%, more than about 75%, more than about 80%, more than about 85%, more than about 90%, about 91%, about 92%, about 93%, about 94%, about 95%, about 96%, about 97%, about 98%, about 99%, or more of the sequences are predetermined sequences of interest).

Methods and devices provided herein involve amplification and/or small assembly reaction volumes such as microvolumes, nanovolumes, picovolumes or sub-picovolumes. Accordingly, aspects of the invention relate to methods and devices for amplification and/or assembly of polynucleotides in small volume droplets on separate and addressable spots of a microfluidic device. For example, a plurality of oligonucleotides complementary to surface-bound single stranded oligonucleotides is synthesized in a predefined reaction microvolume of solution by template-dependant synthesis. In some embodiments, predefined reaction microvolumes of between about 0.5 pL and about 100 nL may be used. However, smaller or larger volumes may be used. In some embodiments, a mechanical wave actuated dispenser may be used for transferring volumes of less than 100 nL, less than 10 nL, less than 5 nL, less than 100 pL, less than 10 pL, or about 0.5 pL or less.

Aspects of the invention provide methods for the amplification of one or more single-stranded oligonucleotide on the channel sidewalls surface. Oligonucleotides may be amplified before or after being detached from the support and/or eluted in a droplet. Preferably, the oligonucleotides are amplified on the surface. One skilled in the art will appreciate that oligonucleotides that are synthesized on solid support will comprise a phosphorylated 3' end or an additional 3'-terminal nucleoside (e.g. T). The 3'-phosphorylated oligonucleotides are not suitable for polynucleotide assembly as the oligonucleotides cannot be extended by polymerase. In preferred aspects of the invention, the oligonucleotides are first amplified and the amplified products are assembled into a polynucleotide. Accordingly, aspect of the invention provides methods wherein a set or subset of oligonucleotides, that are attached to at a set of subset of features of the support, are amplified by locally delivering sub-microvolumes at addressable discrete spots (or features) The term "amplification" means that the number of copies of a nucleic acid fragment is increased. As noted above, the oligonucleotides may be first synthesized onto discrete features of the surface, may be deposited on the substrate or may be deposited on the substrate attached to nanoparticles. In a preferred embodiment, the oligonucleotides are covalently attached to the surface or to nanoparticles deposited on the surface. In an exemplary embodiment, locations or spots comprising the oligonucleotides to be amplified are first selected. In a preferred embodiment, the selected features are in close proximity to each others on the support. Aqueous droplets are then captured on the selected spots thereby forming a droplet comprising hydrated oligonucleotides. In some embodiment the aqueous solution can be water, buffer or a solution promoting enzymatic reactions. In an exemplary embodiment, the solution includes, but is not limited to, a solution promoting primer extension. For example the solution may be composed of oligonucleotides primer(s), nucleotides (dNTPs), buffer, polymerase and cofactors. In other embodiments, the solution is an alkaline denaturing solution. Yet, in other embodiments, the solution may comprise oligonucleotides such as complementary oligonucleotides.

In some embodiments, oligonucleotides or polynucleotides are amplified within the droplet by solid phase PCR thereby eluting the amplified sequences into the droplet. In other embodiments, oligonucleotides or polynucleotides are first detached form the solid support and then amplified. For example, covalently-attached oligonucleotides are translated into surface supported DNA molecules through a process of gaseous cleavage using amine gas. Oligonucleotides can be cleaved with ammonia, or other amines, in the gas phase whereby the reagent gas comes into contact with the oligonucleotide while attached to, or in proximity to, the solid support (see Boal et al., NAR, 1996 (24 (15):3115-7), U.S. Pat. Nos. 5,514,789; 5,738,829 and 6,664,388). In this process, the covalent bond attaching the oligonucleotides to the solid support is cleaved by exposing the solid support to the amine gas under elevated pressure and/or temperature. In some embodiments, this process may be used to "thin" the density of oligonucleotides at specific features. One skilled in the art will appreciate that DNA microarrays can have very high density of oligonucleotides on the surface (approximately $10^8$ molecules per feature), which can generate steric hindrance to polymerases needed for PCR. Theoretically, the oligonucleotides are generally spaced apart by about 2 nm to about 6 nm. For polymerases, a typical 6-subunit enzyme can have a diameter of about 12 nm. Therefore the support may need to be custom treated to address the surface density issue such that the spacing of surface-attached oligonucleotides can accommodate the physical dimension of the enzyme. For example, a subset of the oligonucleotides can be chemically or enzymatically cleaved, or physically removed from the microarray. Other methods can also be used to modify the oligonucleotides such that when primers are applied and annealed to the oligonucleotides, at least some 3' hydroxyl groups of the primers (start of DNA synthesis) are accessible by polymerase. The number of accessible 3' hydroxyl groups per spot can be stochastic or fixed. For example, the primers, once annealed, can be treated to remove some active 3' hydroxyl groups, leaving a stochastic number of 3' hydroxyl groups that can be subject to chain extension reactions. In another example, a large linker molecule (e.g., a concatamer) can be used such that one and only one start of synthesis is available per spot, or in a subset of the oligonucleotides per spot.

According to aspect of the invention, oligonucleotides can be amplified within the droplet, the droplet acting as a virtual reaction chamber. In some embodiments, the entire support or array containing the discrete features is subjected to amplification. In other embodiments, one or more discrete features are subjected to amplification. Amplification of selected independent features (being separated from each others) can be performed by locally heating at least one discrete feature. Discrete features may be locally heated by any means known in the art. For example, the discrete features may be locally heated using a laser source of energy that can be controlled in a precise x-y dimension thereby individually modulating the temperature of a droplet. In another example, the combination of a broader beam laser with a mask can be used to irradiate specific features. In some embodiments, methods to control temperature on the support so that enzymatic reactions can take place on a support (PCR, ligation or any other temperature sensitive reaction) are provided. In some embodiments, a scanning laser is used to control the thermocycling on distinct spots on array. The wavelength used can be chosen from wide spectrum (100 nm to 100,000 nm, i.e. from ultraviolet to infrared). In some embodiments, the feature on which the droplet is spotted comprises an optical absorber or indicator. In some other embodiment, optical absorbent material can be added on the surface of the droplet. In some embodiments, the solid support is cooled by circulation of air or fluid. The energy to be deposited can be calculated based on the absorbance behavior. In some embodiments, the temperature of the droplet can be modeled using thermodynamics. The temperature can be measured by an LCD like material or any other in-situ technology. Yet in another embodiment, the whole support can be heated and cooled down to allow enzymatic reactions to take place. One method to control the temperature of the surface droplets is by using a scanning optical energy deposition setup. An energy source can be directed by a scanning setup to deposit energy at various locations on the surface of the solid support comprising attached or supported molecules. Optical absorbent material can be added on the surface of the solid support or on the surface of droplet. Optical energy source, such as a high intensity lamp, laser, or other electromagnetic energy source (including microwave) can be used. The temperature of the different reaction sites can be controlled independently by controlling the energy deposited at each of the features.

For example, a Digital Micromirror Device (DMD) can be used for temperature control. DMD is an optical semiconductor. See, for example, U.S. Pat. No. 7,498,176. In some embodiments, a DMD can be used to precisely heat selected features or droplets on the solid support. The DMD can be a chip having on its surface several hundred thousand microscopic mirrors arranged in a rectangular array which correspond to the features or droplets to be heated. The mirrors can be individually rotated (e.g., ±10-12°), to an on or off state. In the on state, light from a light source (e.g., a bulb) is reflected onto the solid support to heat the selected spots or droplets. In the off state, the light is directed elsewhere (e.g., onto a heatsink). In one example, the DMD can consist of a 1024× 768 array of 16 μm wide micromirrors. These mirrors can be individually addressable and can be used to create any given pattern or arrangement in heating different features on the solid support. The features can also be heated to different temperatures, e.g., by providing different wavelength for individual spots, and/or controlling time of irradiation.

In certain embodiments, the oligonucleotides are designed to provide the full sense (plus strand) and antisense (minus strand) strands of the polynucleotide construct. After hybridization of the plus and minus strand oligonucleotides, two double-stranded oligonucleotides are subjected to ligation in order to form a first subassembly product. Subassembly products are then subjected to ligation to form a larger nucleic acid or the full nucleic acid sequence.

Ligase-based assembly techniques may involve one or more suitable ligase enzymes that can catalyze the covalent linking of adjacent 3' and 5' nucleic acid termini (e.g., a 5' phosphate and a 3' hydroxyl of nucleic acid(s) annealed on a complementary template nucleic acid such that the 3' terminus is immediately adjacent to the 5' terminus). Accordingly, a ligase may catalyze a ligation reaction between the 5' phosphate of a first nucleic acid to the 3' hydroxyl of a second nucleic acid if the first and second nucleic acids are annealed next to each other on a template nucleic acid). A ligase may be obtained from recombinant or natural sources. A ligase may be a heat-stable ligase. In some embodiments, a thermostable ligase from a thermophilic organism may be used. Examples of thermostable DNA ligases include, but are not limited to: Tth DNA ligase (from *Thermus thermophilus*, available from, for example, Eurogentec and GeneCraft); Pfu DNA ligase (a hyperthermophilic ligase from *Pyrococcus furiosus*); Taq ligase (from *Thermus aquaticus*), any other suitable heat-stable ligase, or any combination thereof. In some embodiments, one or more lower temperature ligases may be used (e.g., T4 DNA ligase). A lower temperature ligase may be useful for shorter overhangs (e.g., about 3, about 4, about 5, or about 6 base overhangs) that may not be stable at higher temperatures.

Non-enzymatic techniques can be used to ligate nucleic acids. For example, a 5'-end (e.g., the 5' phosphate group) and a 3'-end (e.g., the 3' hydroxyl) of one or more nucleic acids may be covalently linked together without using enzymes (e.g., without using a ligase). In some embodiments, non-enzymatic techniques may offer certain advantages over enzyme-based ligations. For example, non-enzymatic techniques may have a high tolerance of non-natural nucleotide analogues in nucleic acid substrates, may be used to ligate short nucleic acid substrates, may be used to ligate RNA substrates, and/or may be cheaper and/or more suited to certain automated (e.g., high throughput) applications.

Non-enzymatic ligation may involve a chemical ligation. In some embodiments, nucleic acid termini of two or more different nucleic acids may be chemically ligated. In some embodiments, nucleic acid termini of a single nucleic acid may be chemically ligated (e.g., to circularize the nucleic acid). It should be appreciated that both strands at a first double-stranded nucleic acid terminus may be chemically ligated to both strands at a second double-stranded nucleic acid terminus. However, in some embodiments only one strand of a first nucleic acid terminus may be chemically ligated to a single strand of a second nucleic acid terminus. For example, the 5' end of one strand of a first nucleic acid terminus may be ligated to the 3' end of one strand of a second nucleic acid terminus without the ends of the complementary strands being chemically ligated.

Accordingly, a chemical ligation may be used to form a covalent linkage between a 5' terminus of a first nucleic acid end and a 3' terminus of a second nucleic acid end, wherein the first and second nucleic acid ends may be ends of a single nucleic acid or ends of separate nucleic acids. In one aspect, chemical ligation may involve at least one nucleic acid substrate having a modified end (e.g., a modified 5' and/or 3' terminus) including one or more chemically reactive moieties that facilitate or promote linkage formation. In some embodiments, chemical ligation occurs when one or more nucleic acid termini are brought together in close proximity (e.g., when the termini are brought together due to annealing between complementary nucleic acid sequences). Accordingly, annealing between complementary 3' or 5' overhangs (e.g., overhangs generated by restriction enzyme cleavage of a double-stranded nucleic acid) or between any combination of complementary nucleic acids that results in a 3' terminus being brought into close proximity with a 5' terminus (e.g., the 3' and 5' termini are adjacent to each other when the nucleic acids are annealed to a complementary template nucleic acid) may promote a template-directed chemical ligation. Examples of chemical reactions may include, but are not limited to, condensation, reduction, and/or photo-chemical ligation reactions. It should be appreciated that in some embodiments chemical ligation can be used to produce naturally occurring phosphodiester internucleotide linkages, non-naturally-occurring phosphamide pyrophosphate internucleotide linkages, and/or other non-naturally-occurring internucleotide linkages.

In some embodiments, the process of chemical ligation may involve one or more coupling agents to catalyze the ligation reaction. A coupling agent may promote a ligation reaction between reactive groups in adjacent nucleic acids (e.g., between a 5'-reactive moiety and a 3'-reactive moiety at adjacent sites along a complementary template). In some embodiments, a coupling agent may be a reducing reagent (e.g., ferricyanide), a condensing reagent such (e.g., cyanoimidazole, cyanogen bromide, carbodiimide, etc.), or irradiation (e.g., UV irradiation for photo-ligation).

In some embodiments, a chemical ligation may be an autoligation reaction that does not involve a separate coupling agent. In autoligation, the presence of a reactive group on one or more nucleic acids may be sufficient to catalyze a chemical ligation between nucleic acid termini without the addition of a coupling agent (see, for example, Xu et al., (1997) Tetrahedron Lett. 38:5595-8). Non-limiting examples of these reagent-free ligation reactions may involve nucleophilic displacements of sulfur on bromoacetyl, tosyl, or iodo-nucleoside groups (see, for example, Xu et al., (2001) Nat. Biotech. 19:148-52). Nucleic acids containing reactive groups suitable for autoligation can be prepared directly on automated synthesizers (see, for example, Xu et al., (1999) Nuc. Acids Res. 27:875-81). In some embodiments, a phosphorothioate at a 3' terminus may react with a leaving group (such as tosylate or iodide) on a thymidine at an adjacent 5' terminus. In some embodiments, two nucleic acid strands bound at adjacent sites on a complementary target strand may undergo auto-ligation by displacement of a 5'-end iodide moiety (or tosylate) with a 3'-end sulfur moiety. Accordingly, in some embodiments the product of an autoligation may include a non-naturally-occurring internucleotide linkage (e.g., a single oxygen atom may be replaced with a sulfur atom in the ligated product).

In some embodiments, a synthetic nucleic acid duplex can be assembled via chemical ligation in a one step reaction involving simultaneous chemical ligation of nucleic acids on both strands of the duplex. For example, a mixture of 5'-phosphorylated oligonucleotides corresponding to both strands of a target nucleic acid may be chemically ligated by a) exposure to heat (e.g., to 97° C.) and slow cooling to form a complex of annealed oligonucleotides, and b) exposure to cyanogen bromide or any other suitable coupling agent under conditions sufficient to chemically ligate adjacent 3' and 5' ends in the nucleic acid complex.

In some embodiments, a synthetic nucleic acid duplex can be assembled via chemical ligation in a two step reaction involving separate chemical ligations for the complementary strands of the duplex. For example, each strand of a target nucleic acid may be ligated in a separate reaction containing phosphorylated oligonucleotides corresponding to the strand that is to be ligated and non-phosphorylated oligonucleotides corresponding to the complementary strand. The non-phosphorylated oligonucleotides may serve as a template for the phosphorylated oligonucleotides during a chemical ligation (e.g., using cyanogen bromide). The resulting single-stranded ligated nucleic acid may be purified and annealed to a complementary ligated single-stranded nucleic acid to form the target duplex nucleic acid (see, for example, Shabarova et al., (1991) Nucl. Acids Res. 19:4247-51).

In one aspect, a nucleic acid fragment may be assembled in a polymerase mediated assembly reaction from a plurality of oligonucleotides that are combined and extended in one or more rounds of polymerase-mediated extensions. In some embodiments, the oligonucleotides are overlapping oligonucleotides covering the full sequence but leaving single-stranded gaps that may be filed in by chain extension. The plurality of different oligonucleotides may provide either positive sequences (plus strand), negative sequences (minus strand), or a combination of both positive and negative sequences corresponding to the entire sequence of the nucleic acid fragment to be assembled. In some embodiments, one or more different oligonucleotides may have overlapping sequence regions (e.g., overlapping 5' regions or overlapping 3' regions). Overlapping sequence regions may be identical (i.e., corresponding to the same strand of the nucleic acid fragment) or complementary (i.e., corresponding to complementary strands of the nucleic acid fragment). The plurality of oligonucleotides may include one or more oligonucleotide pairs with overlapping identical sequence regions, one or more oligonucleotide pairs with overlapping complementary sequence regions, or a combination thereof. Overlapping sequences may be of any suitable length. For example, overlapping sequences may encompass the entire length of one or more nucleic acids used in an assembly reaction. Overlapping sequences may be between about 5 and about 500 oligonucleotides long (e.g., between about 10 and 100, between about 10 and 75, between about 10 and 50, about 20, about 25, about 30, about 35, about 45, about 50, etc.). However, shorter, longer, or intermediate overlapping lengths may be used. It should be appreciated that overlaps between different input nucleic acids used in an assembly reaction may have different lengths.

Polymerase-based assembly techniques may involve one or more suitable polymerase enzymes that can catalyze a template-based extension of a nucleic acid in a 5' to 3' direction in the presence of suitable nucleotides and an annealed template. A polymerase may be thermostable. A polymerase may be obtained from recombinant or natural sources. In some embodiments, a thermostable polymerase from a thermophilic organism may be used. In some embodiments, a polymerase may include a 3'→5' exonuclease/proofreading activity. In some embodiments, a polymerase may have no, or little, proofreading activity (e.g., a polymerase may be a recombinant variant of a natural polymerase that has been modified to reduce its proofreading activity). Examples of thermostable DNA polymerases include, but are not limited to: Taq (a heat-stable DNA polymerase from the bacterium *Thermus aquaticus*); Pfu (a thermophilic DNA polymerase with a 3'→5' exonuclease/proofreading activity from *Pyrococcus furiosus*, available from for example Promega); VentR® DNA Polymerase and VentRO (exo-) DNA Polymerase (thermophilic DNA polymerases with or without a 3'→5' exonuclease/proofreading activity from *Thermococcus litoralis*; also known as Th polymerase); Deep VentR® DNA Polymerase and Deep VentR® (exo-) DNA Polymerase (thermophilic DNA polymerases with or without a 3'→5' exonuclease/proofreading activity from *Pyrococcus* species GB-D; available from New England Biolabs); KOD HiFi (a recombinant *Thermococcus kodakaraensis* KODI DNA polymerase with a 3'→5' exonuclease/proofreading activity, available from Novagen,); BIO-X-ACT (a mix of polymerases that possesses 5'-3' DNA polymerase activity and 3'→5' proofreading activity); Klenow Fragment (an N-terminal truncation of *E. coli* DNA Polymerase I which retains polymerase activity, but has lost the 5'→3' exonuclease activity, available from, for example, Promega and NEB); Sequenase™ (T7 DNA polymerase deficient in T-5' exonuclease activity); Phi29 (bacteriophage 29 DNA polymerase, may be used for rolling circle amplification, for example, in a TempliPhi™ DNA Sequencing Template Amplification Kit, available from Amersham Biosciences); TopoTaq (a hybrid polymerase that combines hyperstable DNA binding domains and the DNA unlinking activity of *Methanopyrus* topoisomerase, with no exonuclease activity, available from Fidelity Systems); TopoTaq HiFi which incorporates a proofreading domain with exonuclease activity; Phusion™ (a *Pyrococcus*-like enzyme with a processivity-enhancing domain, available from New England Biolabs);any other suitable DNA polymerase, or any combination of two or more thereof.

In some embodiments, the polymerase can be a SDP (strand-displacing polymerase; e.g, an SDPe– which is an SDP with no exonuclease activity). This allows isothermal PCR (isothermal extension, isothermal amplification) at a uniform temperature. As the polymerase (for example, Phi29, Bst) travels along a template it displaces the complementary strand (e.g., created in previous extension reactions). As the displaced DNAs are single-stranded, primers can bind at a consistent temperature, removing the need for any thermocycling during amplification, thereby avoiding or decreasing evaporation of the reaction mixture.

It should be appreciated that the description of the assembly reactions in the context of the oligonucleotides is not intended to be limiting. For example, other polynucleotides (e.g. single-stranded, double-stranded polynucleotides, restriction fragments, amplification products, naturally occurring polynucleotides, etc.) may be included in an assembly reaction, along with one or more oligonucleotides, in order to generate a polynucleotide of interest.

In another aspect of the invention, a selected set of features on a oligonucleotide array may be protected from hydration droplet capture by using an immiscible fluid system. An immiscible fluid system, such as oil and aqueous reagents, can be used to achieve passivation of sites on which reactions take place. As shown in FIG. 4, a droplet of oil (or a short chain hydrocarbon) can first be deposited on a site (403) where reaction is undesirable. After the oil deposition, subsequent fluid processing steps will affect only the unprotected sites or features (404), but not the protected sites or features (403) since the fluid (402), cannot reach the surface of the protected site (403). This concept can be further extended to allow controlled exposure or protection at the oil covered spots (403). By using electrowetting concepts, the shape of an oil droplet can be modulated by the appropriate application of electric field. The surface droplet shape can be modulated from its normal state (409) to its actuated state (410) by electrowetting or optoelectrowetting. The effect of such control allows the exposure of a portion or the totality of the feature (109) depending on the applied field.

Accordingly, method steps and/or aspects of the devices provided herein may be automated using, for example, a computer system (e.g., a computer controlled system). A computer system on which aspects of the technology provided herein can be implemented may include a computer for any type of processing (e.g., sequence analysis and/or automated device control as described herein). However, it should be appreciated that certain processing steps may be provided by one or more of the automated devices that are part of the assembly system. In some embodiments, a computer system may include two or more computers. For example, one computer may be coupled, via a network, to a second computer. One computer may perform sequence analysis. The second computer may control one or more of the automated synthesis and assembly devices in the system. In other aspects, additional computers may be included in the network to control one or more of the analysis or processing acts. Each computer may include a memory and processor. The computers can take any form, as the aspects of the technology provided herein are not limited to being implemented on any particular computer platform. Similarly, the network can take any form, including a private network or a public network (e.g., the Internet). Display devices can be associated with one or more of the devices and computers. Alternatively, or in addition, a display device may be located at a remote site and connected for displaying the output of an analysis in accordance with the technology provided herein. Connections between the different components of the system may be via wire, optical fiber, wireless transmission, satellite transmission, any other suitable transmission, or any combination of two or more of the above.

Each of the different aspects, embodiments, or acts of the technology provided herein can be independently automated and implemented in any of numerous ways. For example, each aspect, embodiment, or act can be independently implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above.

In this respect, it should be appreciated that one implementation of the embodiments of the technology provided herein comprises at least one computer-readable medium (e.g., a computer memory, a floppy disk, a compact disk, a tape, etc.) encoded with a computer program (i.e., a plurality of instructions), which, when executed on a processor, performs one or more of the above-discussed functions of the technology provided herein. The computer-readable medium can be transportable such that the program stored thereon can be loaded onto any computer system resource to implement one or more functions of the technology provided herein. In addition, it should be appreciated that the reference to a computer program which, when executed, performs the above-discussed functions, is not limited to an application program running on a host computer. Rather, the term computer program is used herein in a generic sense to reference any type of computer code (e.g., software or microcode) that can be employed to program a processor to implement the above-discussed aspects of the technology provided herein.

It should be appreciated that in accordance with several embodiments of the technology provided herein wherein processes are stored in a computer readable medium, the computer implemented processes may, during the course of their execution, receive input manually (e.g., from a user).

Accordingly, overall system-level control of the assembly devices or components described herein may be performed by a system controller which may provide control signals to the associated nucleic acid synthesizers, liquid handling devices, thermal cyclers, sequencing devices, associated robotic components, as well as other suitable systems for performing the desired input/output or other control functions. Thus, the system controller along with any device controllers together form a controller that controls the operation of a nucleic acid assembly system. The controller may include a general purpose data processing system, which can be a general purpose computer, or network of general purpose computers, and other associated devices, including communications devices, modems, and/or other circuitry or components to perform the desired input/output or other functions. The controller can also be implemented, at least in part, as a single special purpose integrated circuit (e.g., ASIC) or an array of ASICs, each having a main or central processor section for overall, system-level control, and separate sections dedicated to performing various different specific computations, functions and other processes under the control of the central processor section. The controller can also be implemented using a plurality of separate dedicated programmable integrated or other electronic circuits or devices, e.g., hard wired electronic or logic circuits such as discrete element circuits or programmable logic devices. The controller can also include any other components or devices, such as user input/output devices (monitors, displays, printers, a keyboard, a user pointing device, touch screen, or other user interface, etc.), data storage devices, drive motors, linkages, valve controllers, robotic devices, vacuum and other pumps, pressure sensors, detectors, power supplies, pulse sources, communication devices or other electronic circuitry or components, and so on. The controller also may control operation of other portions of a system, such as automated client order processing, quality control, packaging, shipping, billing, etc., to perform other suitable functions known in the art but not described in detail herein.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

EQUIVALENTS

The present invention provides among other things novel methods and devices for high-fidelity gene assembly. While specific embodiments of the subject invention have been discussed, the above specification is illustrative and not restrictive. Many variations of the invention will become apparent to those skilled in the art upon review of this specification. The full scope of the invention should be determined by reference to the claims, along with their full scope of equivalents, and the specification, along with such variations.

INCORPORATION BY REFERENCE

Reference is made to PCT application PCT/US09/55267 and to PCT application PCT/US2010/055298. All publications, patents and sequence database entries mentioned herein are hereby incorporated by reference in their entirety as if each individual publication or patent was specifically and individually indicated to be incorporated by reference.

I claim:

1. A microfluidic system comprising:
a continuous carrier phase fluid comprising droplets that are immiscible with the carrier phase fluid;
at least one main channel adapted to carry the carrier phase fluid, the channel comprising interior walls; and
a plurality of defined surface-capture spots forming a pattern on the channel interior walls, at least one of the plurality of defined surface-capture spots comprising oligonucleotides and a surface area modification having a hydrophilic surface property different than the interior walls, wherein the hydrophilic surface property allows droplet absorption and/or attachment, the plurality of defined surface-capture spots comprising oligonucleotides being configured to allow assembly of the oligonucleotides into a target polynucleotide sequence.

2. The microfluidic system of claim 1 further comprising an inlet module upstream of the main channel.

3. The microfluidic system of claim 1 further comprising an outlet module downstream of the main channel.

4. The microfluidic system of claim 1 wherein the surface modification affects the hydrophilic surface property of at least one of the plurality of defined surface-capture spots.

5. The microfluidic system of claim 1 wherein the carrier phase fluid is a water-immiscible fluid, and wherein the channel interior walls comprise an hydrophobic surface.

6. The microfluidic system of claim 1 wherein each of the plurality of defined surface-capture spots comprises oligonucleotides having a different predetermined sequence that together form the target polynucleotide sequence.

7. The microfluidic system of claim 6 wherein the plurality of defined surface-capture spots form a high density oligonucleotide array.

8. The microfluidic system of claim 1 further comprising a surface-capture module, wherein the surface capture module comprises the plurality of defined surface-capture spots and a force transducer.

9. The microfluidic system of claim 8 wherein the force transducer is an electric field, a magnetic field, a mechanical force, an optically induced force or any combination thereof.

10. The microfluidic system of claim 1 further comprising a force transducer for controlling droplet displacement from a first defined surface-capture spot to a second defined surface-capture spot.

11. The microfluidic system of claim 10 wherein the force transducer is an electric field, a magnetic field, a mechanical force, an optically induced force or any combination thereof.

12. The microfluidic system of claim 1 wherein the droplet is water-based and the carrier phase fluid is oil-based.

13. The microfluidic system of claim 1, wherein one or more of the defined surface-capture spots is passivated.

14. The microfluidic system of claim 13, wherein the passivated surface-capture spot is protected with a reagent.

15. The microfluidic system of claim 14, wherein the reagent is oil or short chain hydrocarbon.

16. The microfluidic system of claim 1, further comprising one or more reagents for performing amplification, assembly, and/or error correction, contained within the droplets.

17. A microfluidic system for assembling a target polynucleotide having a predetermined sequence comprising:
- a continuous carrier phase fluid comprising droplets that are immiscible with the carrier phase fluid;
- a plurality of channels adapted to carry the carrier phase fluid, the channel comprising hydrophobic interior walls;
- a plurality of defined surface-capture spots on the interior walls, the surface-capture spots being chemically modified to confer hydrophilic surface property that allows droplet absorption and/or attachment, each defined surface-capture spot comprising oligonucleotides having a different predetermined subsequence that together form the predetermined sequence of the target polynucleotide; and
- a force transducer for controlling droplet displacement from a first defined surface-capture spot to a second defined surface-capture spot to allow assembly of the oligonucleotides into the target polynucleotide.

18. The microfluidic system of claim 17 further comprising a reaction chamber for the assembly of the target polynucleotide.

19. The microfluidic system of claim 17 wherein the force transducer is an electric field, a magnetic field, a mechanical force, an optically induced force or any combination thereof.

20. The microfluidic system of claim 17, further comprising one or more one or more reagents for performing amplification, assembly, and/or error correction, contained within the droplets.

* * * * *

UNITED STATES PATENT AND TRADEMARK OFFICE
CERTIFICATE OF CORRECTION

PATENT NO. : 9,216,414 B2
APPLICATION NO. : 13/511850
DATED : December 22, 2015
INVENTOR(S) : Larry Li-Yang Chu Page 1 of 1

It is certified that error appears in the above-identified patent and that said Letters Patent is hereby corrected as shown below:

In the claims:

In Claim 20 at column 22, line 15, replace "one or more one or more reagents" with --one or more reagents--.

Signed and Sealed this
Sixteenth Day of August, 2016

Michelle K. Lee
*Director of the United States Patent and Trademark Office*